US012649342B2

(12) United States Patent
Bees et al.

(10) Patent No.: US 12,649,342 B2
(45) Date of Patent: Jun. 9, 2026

(54) SUSPENSION SYSTEM

(71) Applicant: BAE SYSTEMS PLC, London (GB)

(72) Inventors: David Bees, Warwickshire (GB); James Hopton, Warwickshire (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/849,244

(22) PCT Filed: Mar. 10, 2023

(86) PCT No.: PCT/GB2023/050565
§ 371 (c)(1),
(2) Date: Sep. 20, 2024

(87) PCT Pub. No.: WO2023/180687
PCT Pub. Date: Sep. 28, 2023

(65) Prior Publication Data
US 2026/0001380 A1      Jan. 1, 2026

(30) Foreign Application Priority Data

Mar. 23, 2022    (EP) ..................................... 22275033
Mar. 23, 2022    (GB) ..................................... 2204038

(51) Int. Cl.
*B60G 3/20*          (2006.01)
*B60G 17/08*        (2006.01)
(52) U.S. Cl.
CPC ............... *B60G 3/20* (2013.01); *B60G 17/08* (2013.01); *B60G 2200/144* (2013.01);
(Continued)
(58) Field of Classification Search
CPC ...... B60G 3/20; B60G 17/08; B60G 2200/18; B60G 2200/144; B60G 2202/24;
(Continued)

(56) References Cited

U.S. PATENT DOCUMENTS 2,376,849 A       5/1945   Rossmanith
3,306,390 A  *  2/1967   Jamme ................... B62D 61/12
                                                                        180/41
(Continued)

FOREIGN PATENT DOCUMENTS

CH               697556 B1 * 11/2008   ............ E02F 9/0841
CN        104477146 A  *  4/2015    ........... B62D 57/028
(Continued)

OTHER PUBLICATIONS

International Search Report and Written Opinion received for PCT/GB2023/050565. Mail Date: Jun. 20, 2023. 10 pages.
(Continued)

*Primary Examiner* — Keith J Frisby
(74) *Attorney, Agent, or Firm* — Arcane Law PLLC

(57)          ABSTRACT

A suspension system (400) for supporting a chassis (200) of a vehicle (100). The suspension system (400) comprises a suspension unit (442). The suspension unit (442) comprises a wheel arm assembly (444) comprising a first wheel arm (402) having a chassis mount end (410) and a wheel mount end (412). The chassis mount end (410) of the first wheel arm (402) is provided with a chassis mounting member (414), the chassis mount end (410) of the first wheel arm (402) and chassis mounting member (414) being pivotable relative to one another around a chassis mount pivoting axis (230). The chassis mounting member (414) is configured to support the chassis mount end (410) of the first wheel arm (402) so that the first wheel arm (402) and chassis mounting member (414) are operable to pivot 180 degrees relative to one another about the chassis mount pivoting axis (230).

20 Claims, 23 Drawing Sheets

(52) U.S. Cl.
CPC ...... *B60G 2200/18* (2013.01); *B60G 2202/24* (2013.01); *B60G 2202/41* (2013.01); *B60G 2300/40* (2013.01); *B60Y 2400/86* (2013.01)

(58) Field of Classification Search
CPC ............ B60G 2202/41; B60G 2300/40; B62D 49/0678; B62D 57/028; E02F 9/024; B60Y 2400/86
USPC .................................................... 280/124.15
See application file for complete search history.

(56) References Cited

U.S. PATENT DOCUMENTS

| | | | | |
|---|---|---|---|---|
| 3,664,448 | A * | 5/1972 | Hudis | B60P 1/02 |
| | | | | 180/9.46 |
| 3,899,037 | A * | 8/1975 | Yuker | B60G 17/01925 |
| | | | | 180/41 |
| 3,912,289 | A | 10/1975 | Czajkowski | |
| 4,241,803 | A | 12/1980 | Lauber | |
| 4,265,326 | A | 5/1981 | Lauber | |
| 4,558,758 | A * | 12/1985 | Littman | B66F 11/046 |
| | | | | 182/2.11 |
| 6,311,795 | B1 | 11/2001 | Skotnikov et al. | |
| 6,443,687 | B1 * | 9/2002 | Kaiser | E02F 9/024 |
| | | | | 180/209 |
| 9,174,488 | B2 * | 11/2015 | Berry | B60B 35/10 |
| 11,260,717 | B2 * | 3/2022 | Gao | B62D 61/12 |
| 11,524,735 | B2 * | 12/2022 | Ishikawa | B25J 5/007 |
| 12,134,438 | B2 * | 11/2024 | Min | B62D 7/14 |
| 12,427,824 | B2 * | 9/2025 | Ida | B62D 61/10 |
| 2008/0190682 | A1 * | 8/2008 | Mahy | B60G 17/015 |
| | | | | 180/209 |
| 2015/0259185 | A1 * | 9/2015 | Ditty | B66F 11/046 |
| | | | | 182/19 |
| 2016/0096550 | A1 * | 4/2016 | Dames | B62D 7/142 |
| | | | | 280/86.758 |
| 2016/0297474 | A1 * | 10/2016 | Shi | F16D 65/14 |
| 2018/0327021 | A1 * | 11/2018 | Brooks | B62D 7/148 |
| 2019/0210670 | A1 | 7/2019 | Bodin | |
| 2019/0248233 | A1 * | 8/2019 | Calleija | B60B 37/10 |
| 2021/0163089 | A1 * | 6/2021 | Ishikawa | B60G 17/0162 |
| 2022/0176765 | A1 * | 6/2022 | Gao | B60K 7/0007 |
| 2022/0256761 | A1 * | 8/2022 | Ni | B60K 7/0007 |

| | | | | |
|---|---|---|---|---|
| 2023/0107884 | A1 | 4/2023 | Sundquist | |
| 2023/0211841 | A1 * | 7/2023 | Fu | B62D 57/032 |
| | | | | 180/8.1 |
| 2023/0303174 | A1 * | 9/2023 | Colasse | B60B 35/12 |
| 2023/0406039 | A1 * | 12/2023 | Ritzenhöfer | B60B 35/1036 |
| 2024/0043073 | A1 * | 2/2024 | Prashant Rao | B60L 15/2036 |
| 2025/0198721 | A1 | 6/2025 | Lewin | |

FOREIGN PATENT DOCUMENTS

| | | | | | |
|---|---|---|---|---|---|
| CN | 104709196 | A | * | 6/2015 | ......... B60G 17/0195 |
| CN | 105378192 | A | * | 3/2016 | ......... B05B 13/0405 |
| CN | 109109996 | A | * | 1/2019 | .......... B62D 57/028 |
| CN | 209756679 | U | * | 12/2019 | |
| CN | 110770053 | A | * | 2/2020 | .............. B60G 3/20 |
| CN | 112298395 | A | * | 2/2021 | .......... B62D 57/028 |
| CN | 113619683 | A | * | 11/2021 | .............. B62D 7/16 |
| DE | 19817899 | A1 | * | 11/1998 | .............. E02F 9/028 |
| DE | 102015221720 | A1 | * | 5/2017 | ............ B60B 35/14 |
| EP | 1502843 | A2 | * | 2/2005 | .......... B62D 55/075 |
| EP | 2537684 | B1 | * | 5/2014 | ............ B60B 35/10 |
| EP | 3388263 | B1 | * | 6/2021 | ......... B60G 21/023 |
| FR | 2472635 | A1 | * | 7/1981 | .............. E02F 9/085 |
| FR | 3092791 | A1 | * | 8/2020 | .............. B60G 3/20 |
| GB | 197659 | A | | 9/1923 | |
| GB | 1438403 | A | | 6/1976 | |
| GB | 2402658 | A | * | 12/2004 | .......... B62D 61/00 |
| WO | WO-8400729 | A1 | * | 3/1984 | .............. H04B 5/00 |
| WO | WO-9210391 | A1 | * | 6/1992 | ........ B62D 49/0678 |
| WO | WO 00/32462 | | * | 6/2000 | |
| WO | WO-2004024541 | A1 | * | 3/2004 | ........ B62D 49/0678 |
| WO | WO-2007081452 | A1 | * | 7/2007 | .......... B62D 57/028 |
| WO | 2007097779 | A2 | | 8/2007 | |
| WO | WO-2016039312 | A1 | * | 3/2016 | .............. B62D 7/18 |
| WO | WO-2021238421 | A1 | * | 12/2021 | .......... A01C 23/047 |
| WO | 2023180686 | A1 | | 9/2023 | |
| WO | 2023180687 | A1 | | 9/2023 | |

OTHER PUBLICATIONS

Extended European Search Report received for EP Application No. 22275033.3. Mail Date: Sep. 9, 2022. 8 pages.
GB Search Report received for GB Application No. 2204038.0. Mail Date: Sep. 9, 2022. 3 pages.

* cited by examiner

Fig. 9
Fig. 10
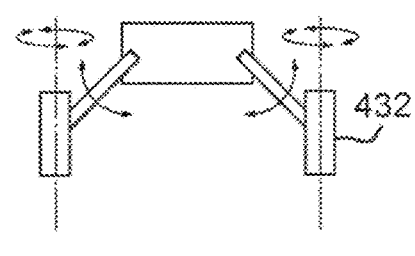
Fig. 11
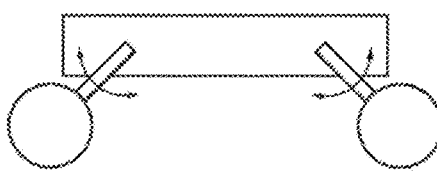
Fig. 12
Fig. 13
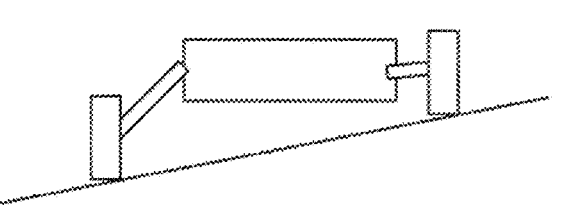

SUSPENSION SYSTEM

FIELD

The present disclosure relates to a suspension system for a vehicle.

BACKGROUND

Conventionally wheeled and tracked vehicles, particularly vehicles intended for off-road use, utilise a suspension system of some form. The basic functions of the suspension system are to dampen shock and vibration induced by crossing rough ground, enable the vehicle to cross non-level terrain, maintain vehicle grip and control by maximizing the time that all the wheels maintain ground contact and/or stabilise the vehicle on rough terrain and during manoeuvres such as cornering.

Conventionally the basic elements of a suspension system are a wheel or swing arm to enable the wheel to move relative to the vehicle body, with a spring to provide a restorative force and/or a damper to dampen the wheel movements.

Beyond these core fundamentals there is a huge variety of different suspension layouts designed for different tasks. Some relate to trying to achieve enhanced off-road mobility of vehicles. These designs are tuned to the specific needs of a vehicle platform, and hence provide excellent solutions in some areas of performance, but are compromised in others.

Hence a suspension system which enables a vehicle to be more agile than examples of the related art, and able to operate in a wide range of scenarios so it may successfully tackle a wider range of obstacles, terrain and conditions, whilst remaining stable, is highly desirable.

SUMMARY

According to the present disclosure there is provided a system, method, apparatus and as set forth in the appended claims. Other features of the invention will be apparent from the dependent claims, and the description which follows.

Accordingly there may be provided a suspension system (400) for supporting a chassis (200) of a vehicle (100), the suspension system (400) comprising a suspension unit (442). The suspension unit (442) may comprise a wheel arm assembly (444) comprising a first wheel arm (402) having a chassis mount end (410) and a wheel mount end (412). The chassis mount end (410) of the first wheel arm (402) may be provided with a chassis mounting member (414). The chassis mount end (410) of the first wheel arm (402) and chassis mounting member (414) may be pivotable relative to one another around a chassis mount pivoting axis (230). The chassis mounting member (414) may be configured to support the chassis mount end (410) of the first wheel arm (402) so that the first wheel arm (402) and chassis mounting member (414) are operable to pivot at least 180 degrees relative to one another about the chassis mount pivoting axis (230). The wheel mount end (412) of the first wheel arm (402) may be provided with a wheel mounting member (416). The wheel mount end (412) of the first wheel arm (402) and wheel mounting member (416) may be pivotable relative to one another around a wheel mount pivoting axis (432). The wheel mounting member (416) may be configured to couple with the wheel mount end (412) of the first wheel arm (402) so that the first wheel arm (402) and wheel mounting member (416) are operable to pivot at least 180 degrees relative to one another about the wheel mount pivoting axis (432).

A chassis end trunnion (222) may be provided at the chassis mount end (410) of the first wheel arm (402), the chassis end trunnion (222) being pivotably attached to the chassis mounting member (414), the chassis end trunnion (222) and chassis mounting member (414) being pivotable relative to one another around the chassis mount pivoting axis (230). The chassis mounting member (414) may be configured to support the chassis mount end (410) of the first wheel arm (402) via the chassis end trunnion (222) such that a clearance is maintained around the chassis mount end (410) of the first wheel arm (402) to provide a space for the chassis mount end (410) of the first wheel arm end (412) to move through.

A wheel end trunnion (446) may be provided at the wheel mount end (412) of the first wheel arm (402), the wheel end trunnion (446) being pivotably attached to the wheel mounting member (416), the wheel end trunnion (446) and wheel mounting member (416) being pivotable relative to one another around the wheel mount pivoting axis (432); and the wheel mounting member (416) may be configured to support the wheel mount end (412) of the first wheel arm (402) via the wheel end trunnion (446) such that a clearance is maintained around the wheel mount end (412) of the first wheel arm (402) to provide a space for the wheel mount end (412) of the first wheel arm (402) to move through.

The chassis mount pivoting axis (230) may be parallel to the wheel mount pivoting axis (432).

The wheel arm assembly (444) may comprise a second wheel arm (406), the second wheel arm (406) having a chassis mount end (410) and a wheel mount end (412). The chassis mount end (410) of the second wheel arm (406) and chassis mounting member (414) may be pivotable relative to one another around the chassis mount pivoting axis (230). The chassis mounting member (414) may be configured to support the chassis mount end (410) of the second wheel arm (406) so that the second wheel arm (406) and chassis mounting member (414) are operable to pivot at least 180 degrees relative to one another about the chassis mount pivoting axis (230). The wheel mount end (412) of the second wheel arm (406) and wheel mounting member (416) may be pivotable relative to one another around the wheel mount pivoting axis (432). The wheel mounting member (416) may be configured to couple with the wheel mount end (412) of the second wheel arm (406) so that the second wheel arm (406) and wheel mounting member (416) are operable to pivot at least 180 degrees relative to one another about the wheel mount pivoting axis (432).

The chassis end trunnion (222) may be coupled to the chassis mount end (410) of the second wheel arm (406), and the chassis mounting member (414) may be configured to support the chassis mount end (410) of the second wheel arm (406) via the chassis end trunnion (222) such that a clearance is maintained around the chassis mount end (410) of the second wheel arm (406) to provide a space for the chassis mount end (410) of the second wheel arm (406) end to move through.

The wheel end trunnion (446) may be coupled to the wheel mount end (412) of the second wheel arm (406), and the wheel mounting member (416) may be configured to support the wheel mount end (412) of the second wheel arm (406) via the wheel end trunnion (446) such that a clearance is maintained around the wheel mount end (412) of the second wheel arm (406) to provide a space for the chassis mount end (410) of the second wheel arm (406) end to move through.

A wheel (404) for supporting the chassis (200) may be rotatably coupled to the wheel mounting member (416).

A first actuator (470) may be coupled to the first wheel arm (402) and/or chassis mounting member (414) and operable to cause the first wheel arm (402) and chassis mounting member (414) to pivot relative to one another. A second actuator (472) may be coupled to the first wheel arm (402) and/or wheel mounting member (416) and operable to cause the first wheel arm (402) and wheel mounting member (416) to pivot relative to one another.

The suspension system (400) may further comprise a third actuator (474), wherein one end of the third actuator (474) is coupled to the first wheel arm (402) and the other end of the third actuator (474) is coupled to the chassis mounting member (414), the third actuator (474) operable to move the first wheel arm (402) from a first position relative to the chassis (200) to a second position relative the chassis (200) to thereby alter the height of the chassis (200) from a support surface on which it stands.

There may be provided a method of control of operating a suspension system (400) for a vehicle (100), the suspension system (400) comprising: a wheel arm assembly (444) comprising a first wheel arm (402) having a chassis mount end (410) and a wheel mount end (412); the chassis mount end (410) of the first wheel arm (402) being provided with a chassis mounting member (414), the chassis mount end (410) of the first wheel arm (402) and chassis mounting member (414) being pivotable relative to one another around a chassis mount pivoting axis (230); and the chassis mounting member (414) configured to support the chassis mount end (410) of the first wheel arm (402) so that the first wheel arm (402) and chassis mounting member (414) are operable to pivot at least 180 degrees relative to one another about the chassis mount pivoting axis (230); the wheel mount end (412) of the first wheel arm (402) being provided with a wheel mounting member (416), the wheel mount end (412) of the first wheel arm (402) and wheel mounting member (416) being pivotable relative to one another around a wheel mount pivoting axis (432); and the wheel mounting member (416) is configured to couple with the wheel mount end (412) of the first wheel arm (402) so that the first wheel arm (402) and wheel mounting member (416) are operable to pivot at least 180 degrees relative to one another about the wheel mount pivoting axis (432); a first actuator (470) is coupled to the first wheel arm (402) and/or chassis mounting member (414) and operable to cause the first wheel arm (402) and chassis mounting member (414) to pivot relative to one another; and a second actuator (472) is coupled to the first wheel arm (402) and/or wheel mounting member (416) and operable to cause the first wheel arm (402) wheel mounting member (416) to pivot relative to one another; wherein the method comprises the steps of: operating the first actuator (470) to move the first wheel arm (402) and chassis mounting member (414) relative to one another about the chassis mount pivoting axis (230); operating the second actuator (472) to move the first wheel arm (402) and wheel mounting member (416) relative to one another about the wheel mount pivoting axis (432); wherein the first actuator (470) and second actuator (472) are operable independently of one another.

The suspension system (400) may further comprise a third actuator (474), wherein one end of the third actuator (474) is coupled to the first wheel arm (402) and the other end of the third actuator (474) is coupled to the chassis mounting member (414), the third actuator (474) operable to move the first wheel arm (402) from a first position relative to the chassis (200) to a second position relative the chassis (200) wherein the method comprises the steps of: operating the third actuator (474) to move the first wheel arm (402) from a first position relative to the chassis (200) to a second position relative the chassis (200) to thereby alter the height of the chassis (200) from a support surface on which it stands; and wherein the third actuator (474) is operable independently of the first actuator (470) and second actuator (472).

There may also be provided a vehicle (100) comprising a chassis (200) and a suspension system (400) according to the present disclosure.

The chassis (200) may define a plurality of mounting positions (240) for a wheel arm chassis mounting member (414), the mounting positions (240) spaced around the periphery of the chassis (200), at least some of the mounting positions (240) being coupled to a respective suspension unit (442); and the chassis (200) defines a substantially four sided polygonal periphery, and defines mounting positions (240) for wheel arm chassis mounts (220) on the sides of the chassis (200), the mounting positions (240) being provided proximate to, or at, each corner of the chassis (200).

The mounting positions (240) for the wheel arm chassis mounting member (414) may be spaced apart, and the components of the suspension units (442) are configured such that throughout range of motion of the wheel arms (402) and wheels (404) any one of the suspension units (442) remains spaced apart from any one of the other wheel arms (402) and wheels (404) of another suspension units (442).

The arrangement allows for an agile, lightweight and versatile platform that is configured to remain operational in a wide range of scenarios.

BRIEF DESCRIPTION OF THE FIGURES

Embodiments of the invention will now be described by way of example only with reference to the figures, in which:

FIGS. 9 to 11 illustrate the directions of motion of the suspension units, as well as illustrating a standard travel mode of operation of the suspension system;

FIGS. 12 to 16 illustrate a slope traverse mode of operation of the suspension system;

DETAILED DESCRIPTION

The present disclosure relates to a suspension system 400, as shown in FIGS. 1 to 5, for supporting a chassis 200 of a vehicle 100, as shown in FIGS. 6 to 42. The present disclosure may also relate to a vehicle 100 comprising a chassis 200 having the suspension system 400. The present disclosure also relates to a method of operating the suspension system 400 for a vehicle 100. The vehicle may be a self-propelled vehicle. The present disclosure incorporates by reference the subject matter of co-pending patent application, filed on the same date by the same applicant and entitled GUN TARGETING SYSTEM.

Figure 6:
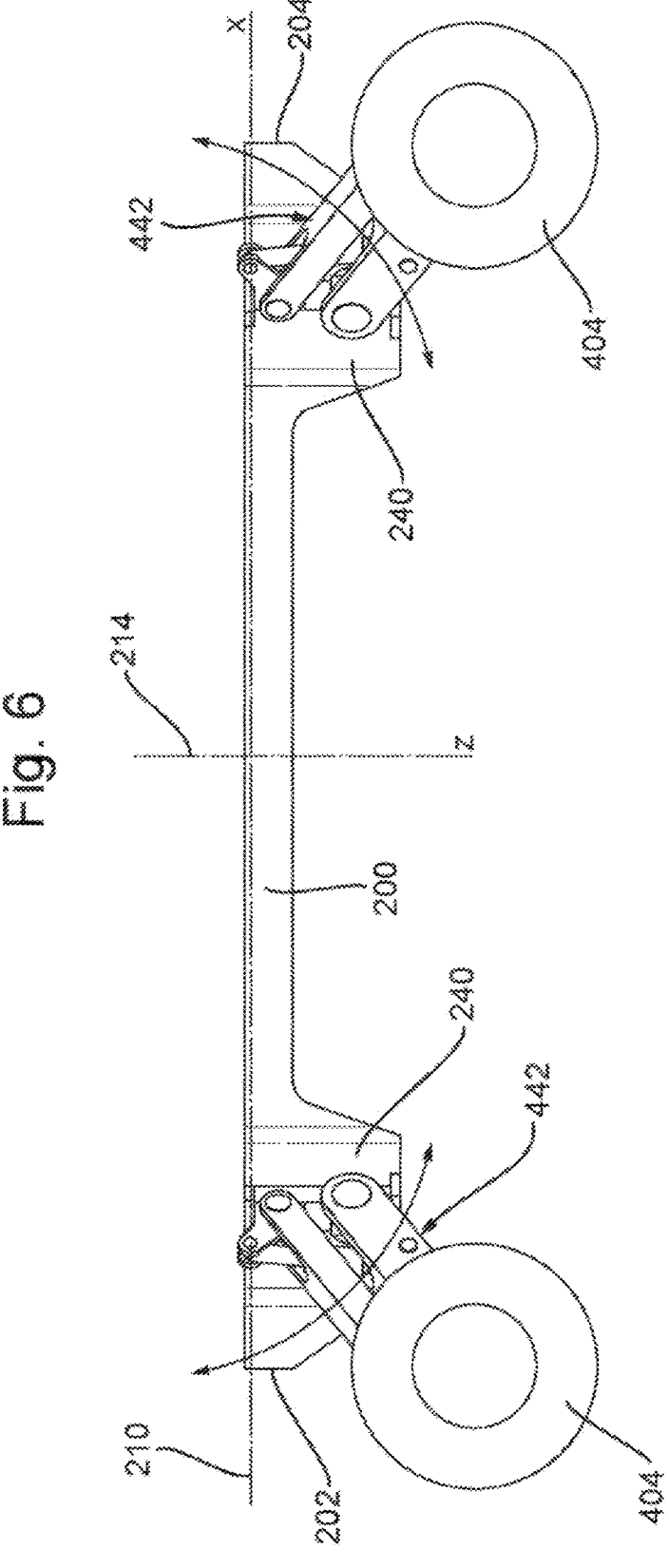
FIGS. 6 to 8 show a suspension system comprising the suspension units coupled to a chassis to form at least part of a vehicle.
Figures 7, 8:
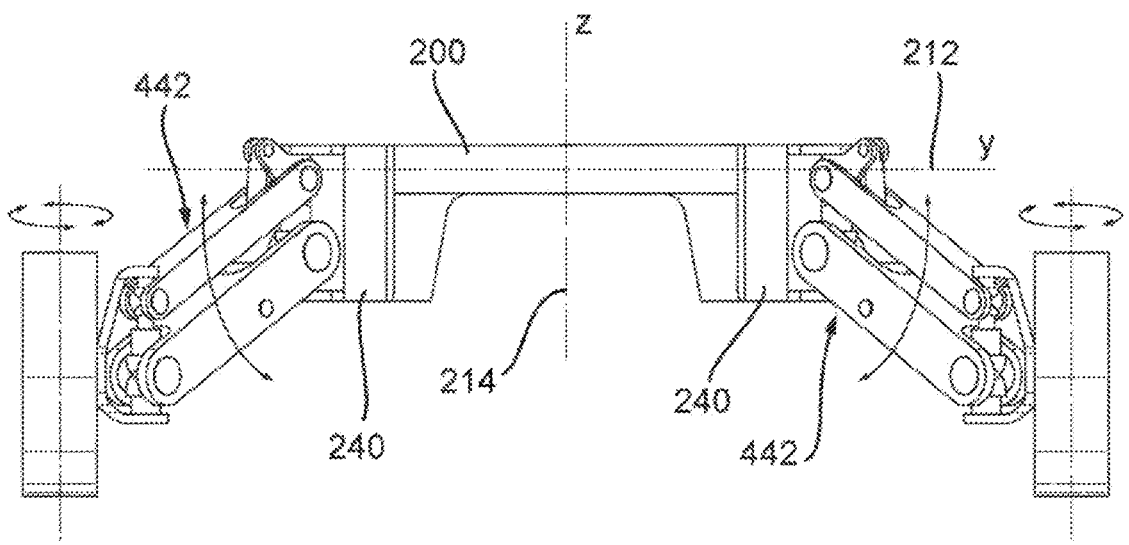
Figure 14:
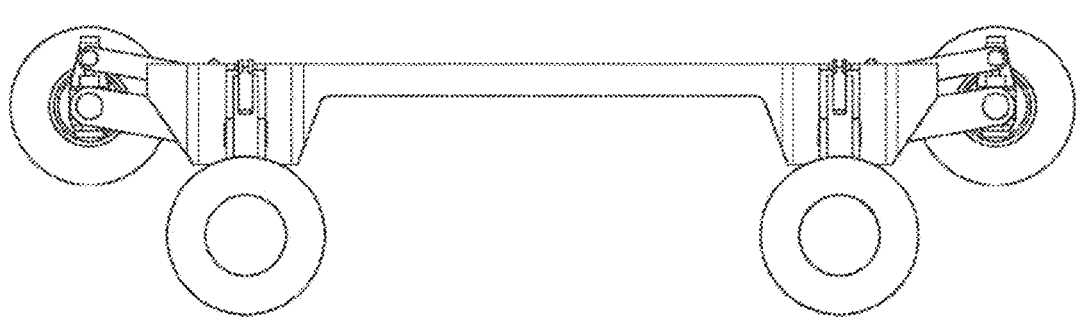
Figure 15:
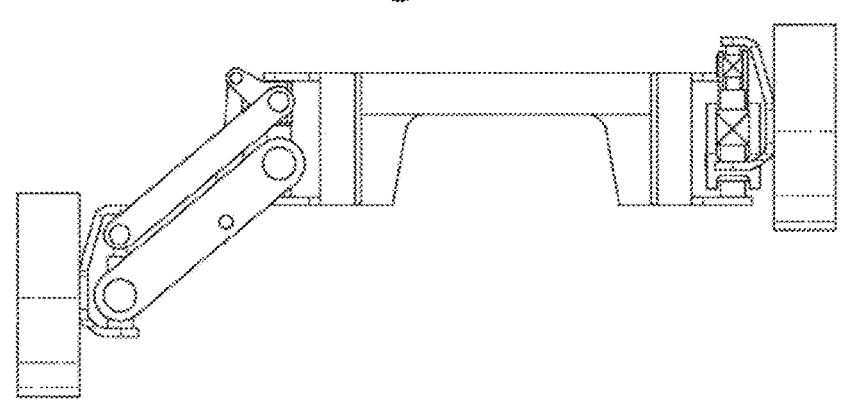
Figure 16:
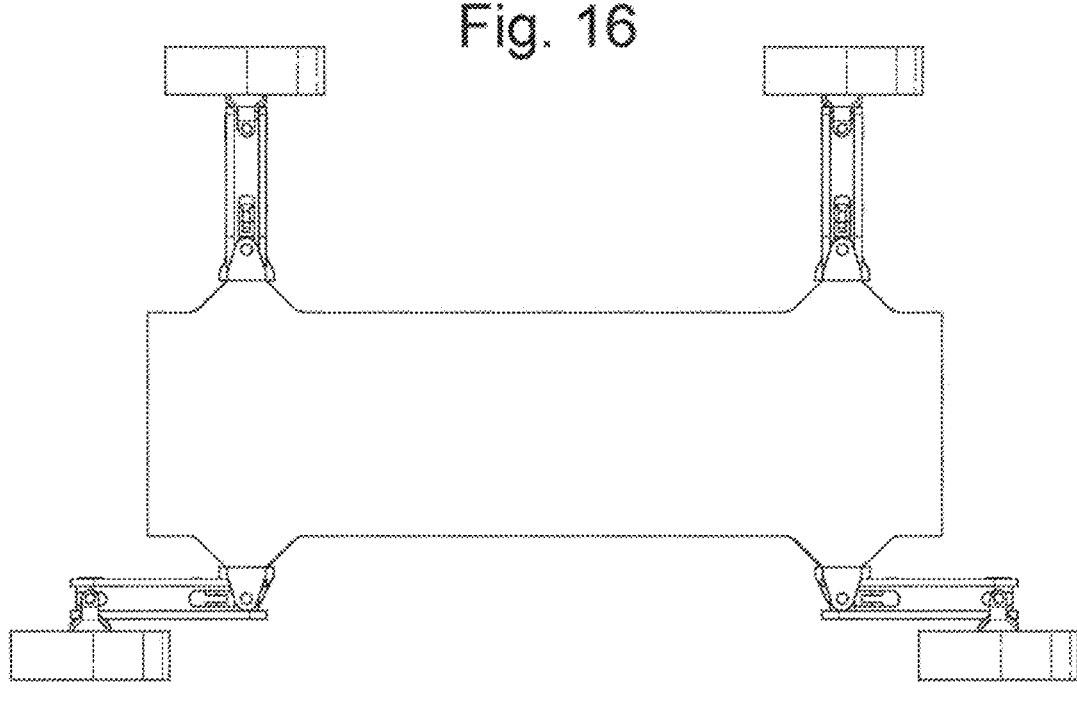
Figure 17:
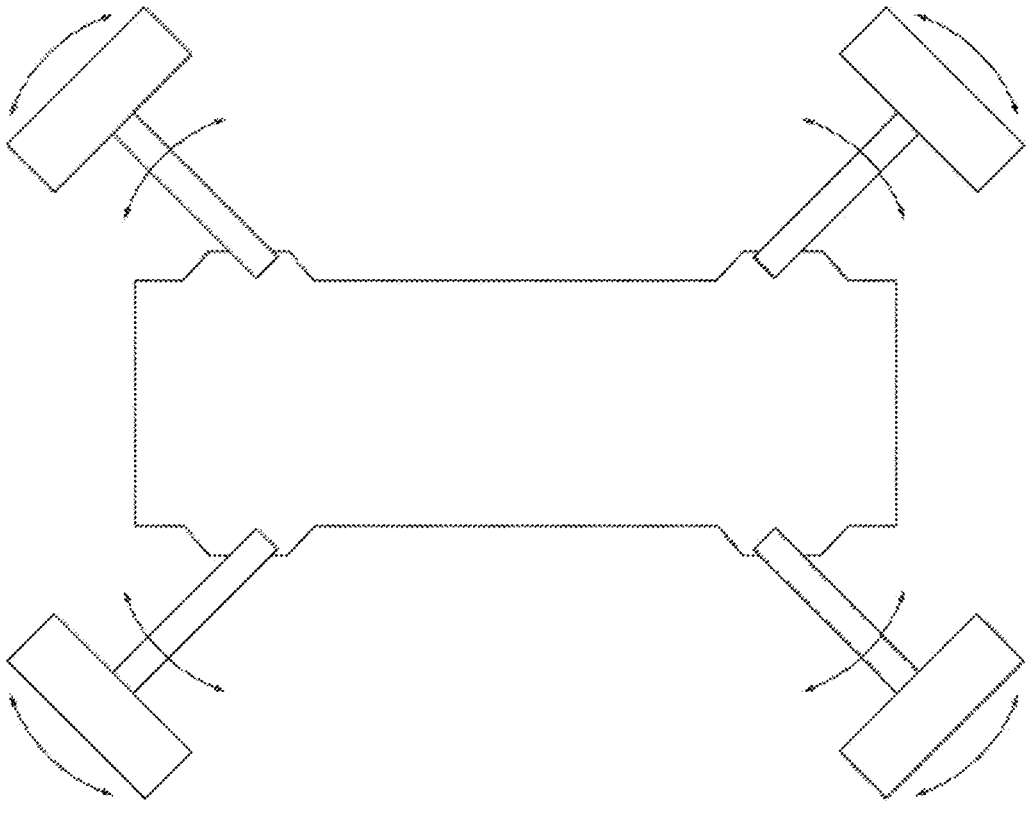
FIGS. 17 to 21 illustrate a turn on the spot mode of operation of the suspension system.
Figures 18, 19:
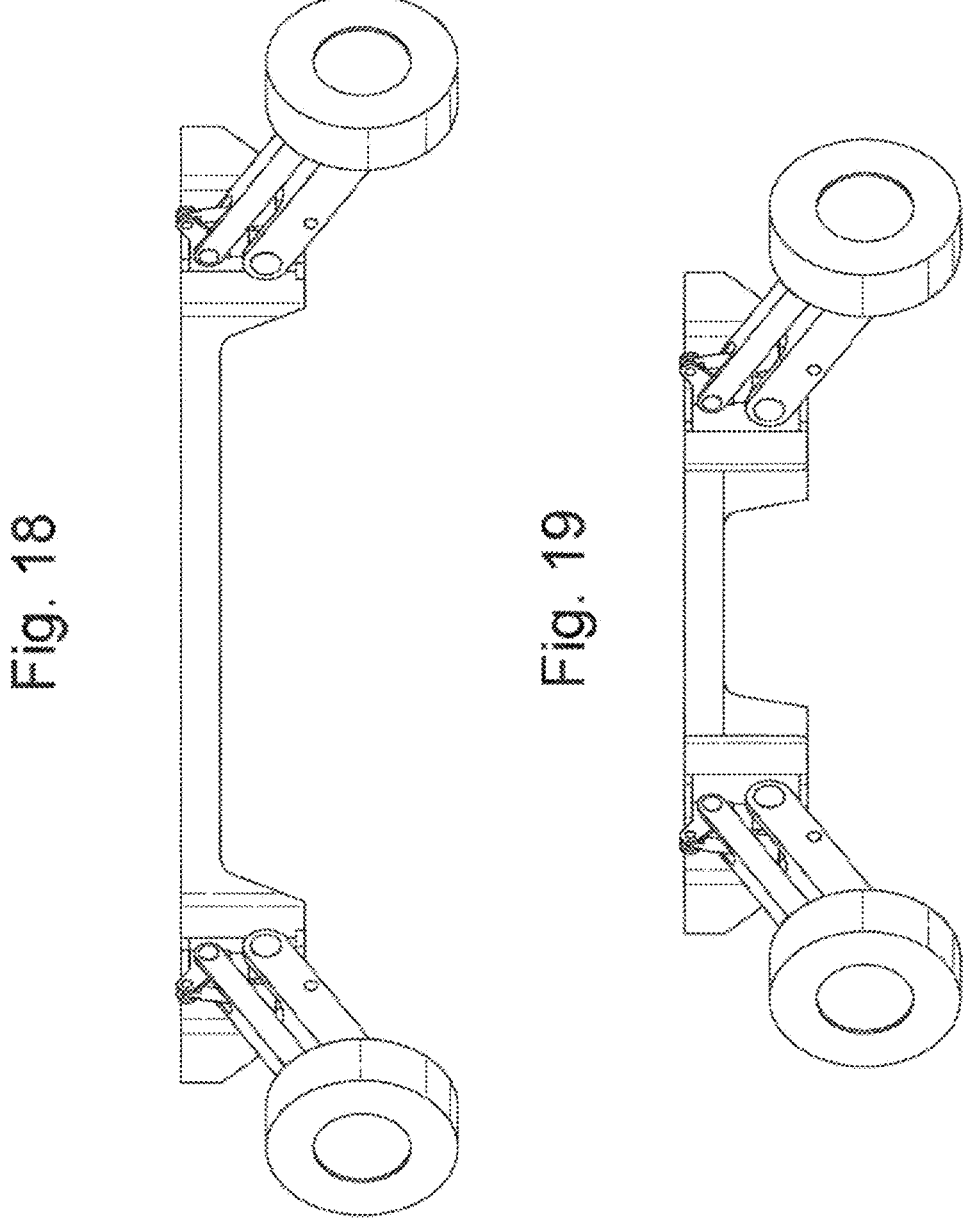
Figure 20:
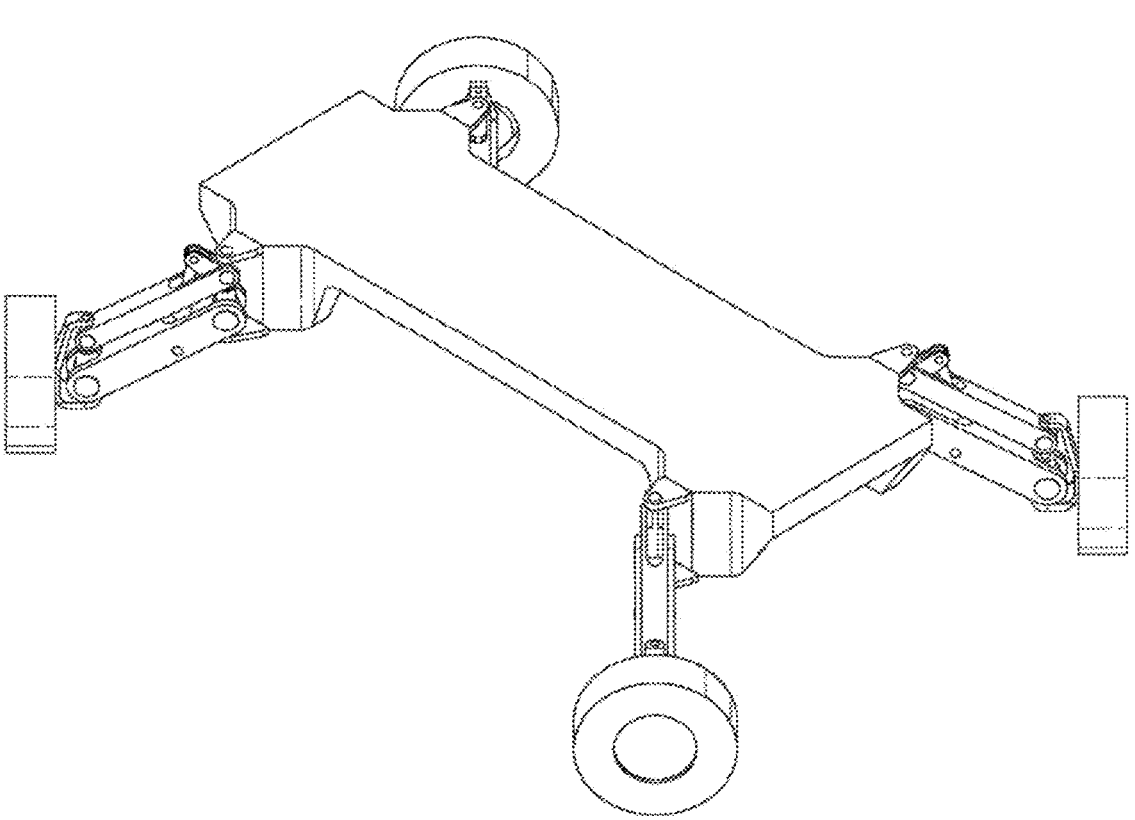
Figure 21:
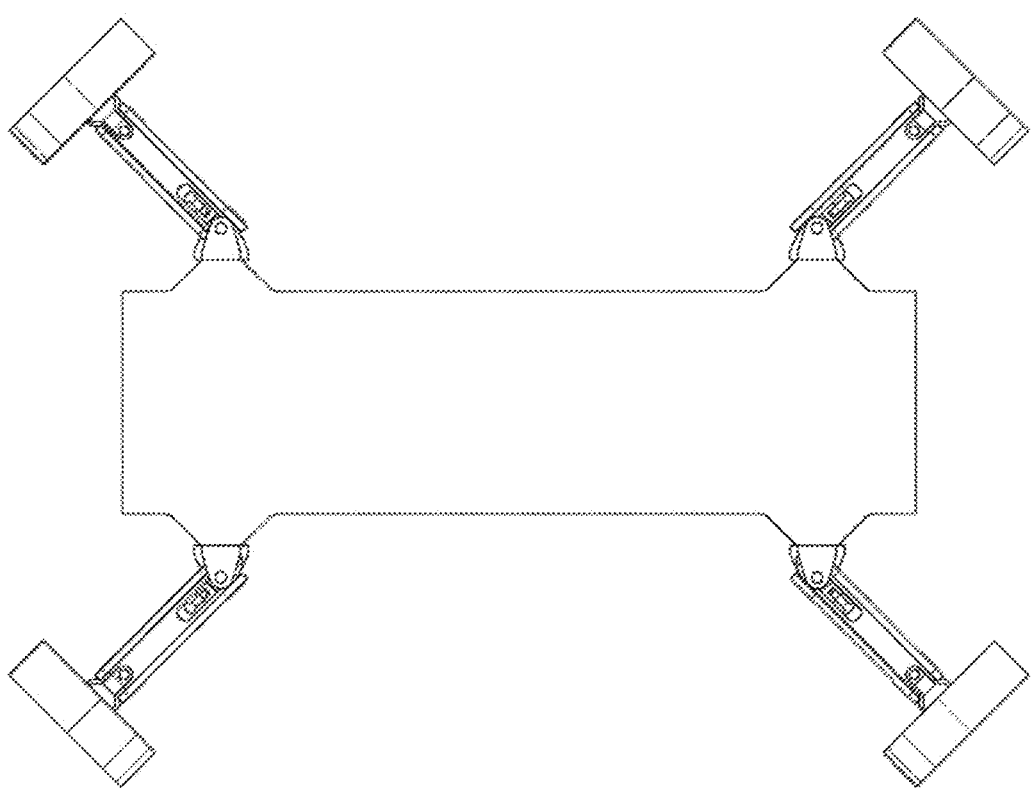
Figure 22:
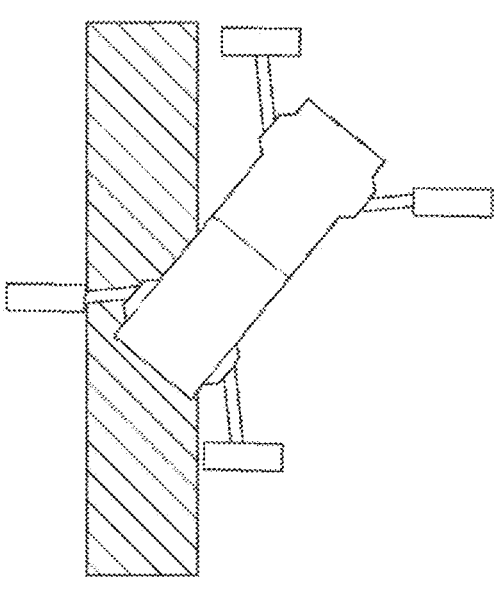
FIGS. 22 to 26 illustrate a gap crossing mode operation of the suspension system.
Figure 23:
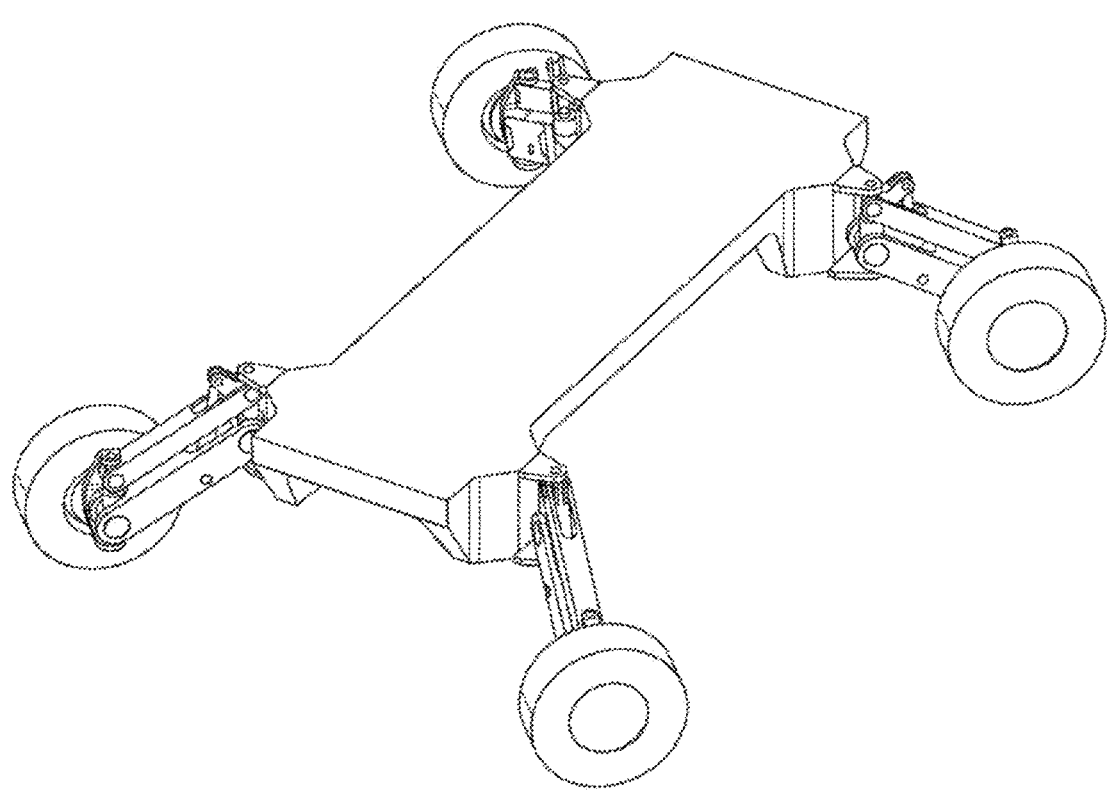
Figures 24, 25:
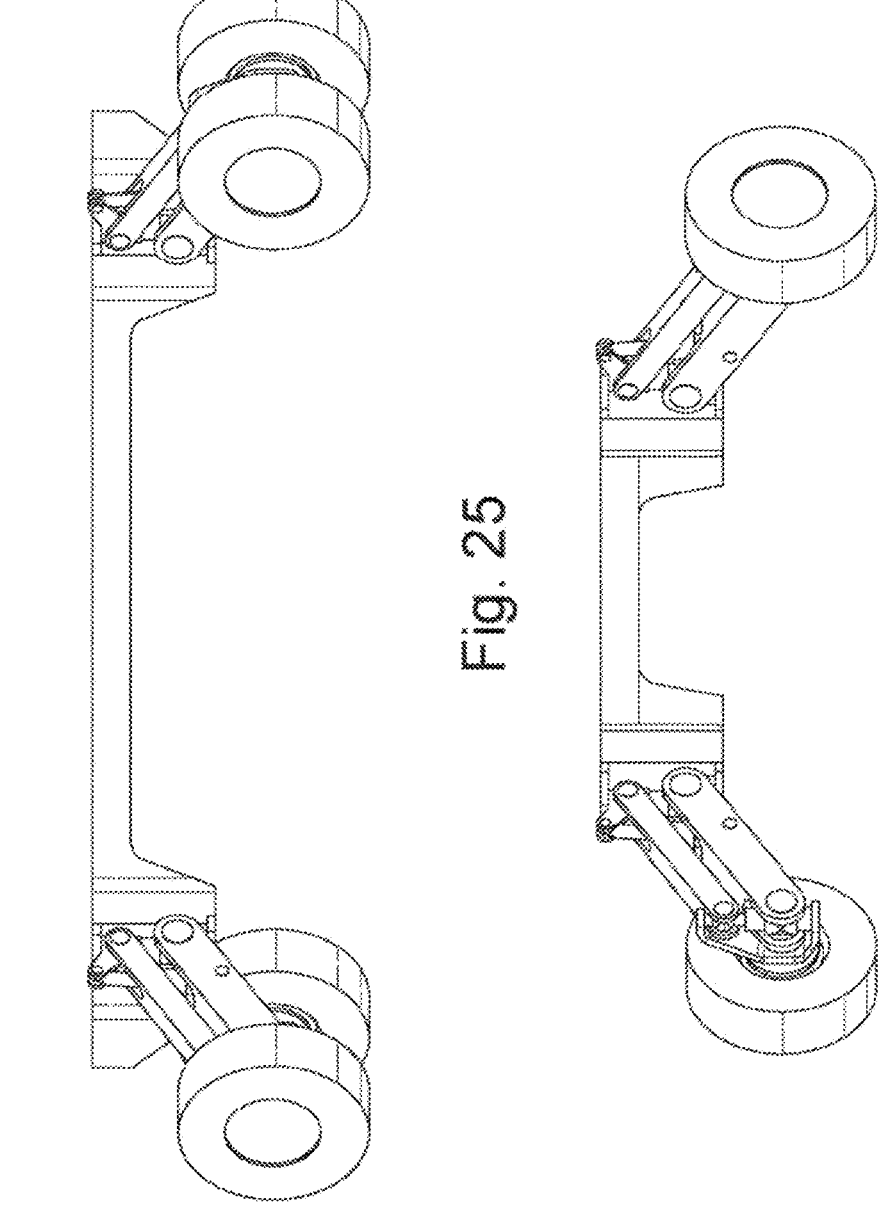
Figure 26:
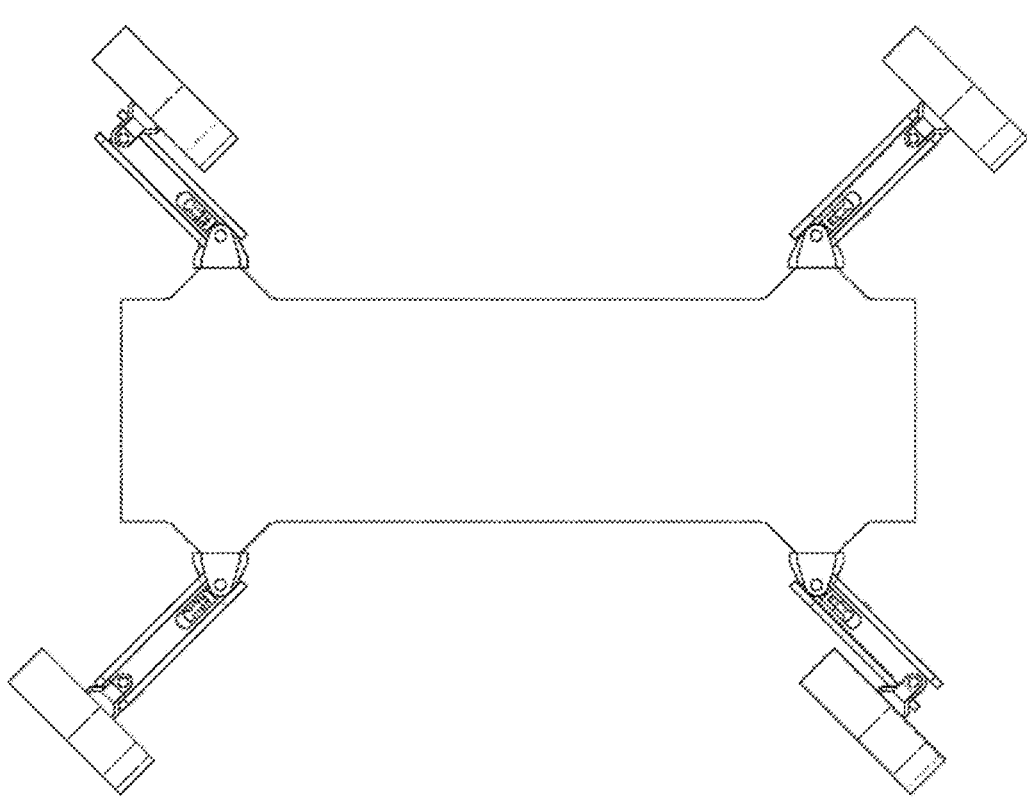
Figure 27:
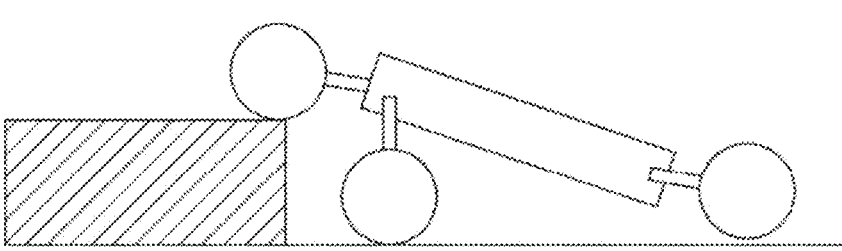
FIGS. 27 to 31 illustrate a step climb mode of operation of the suspension system.
Figure 28:
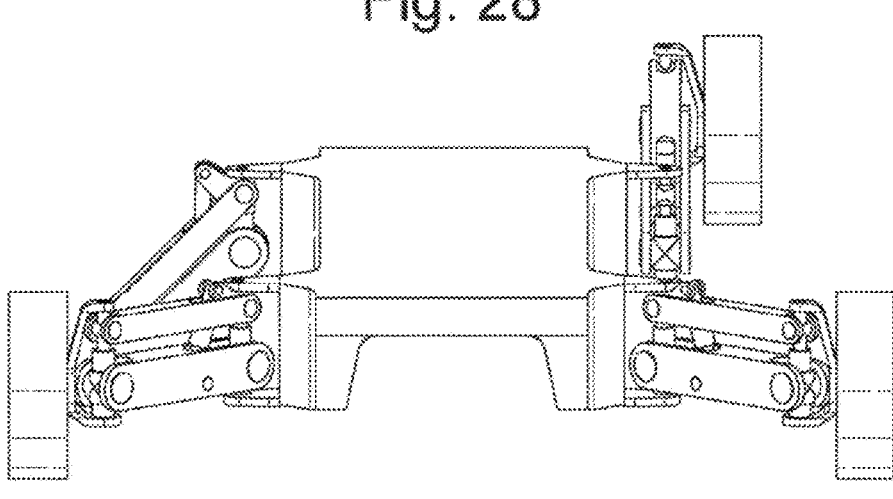
Figure 29:
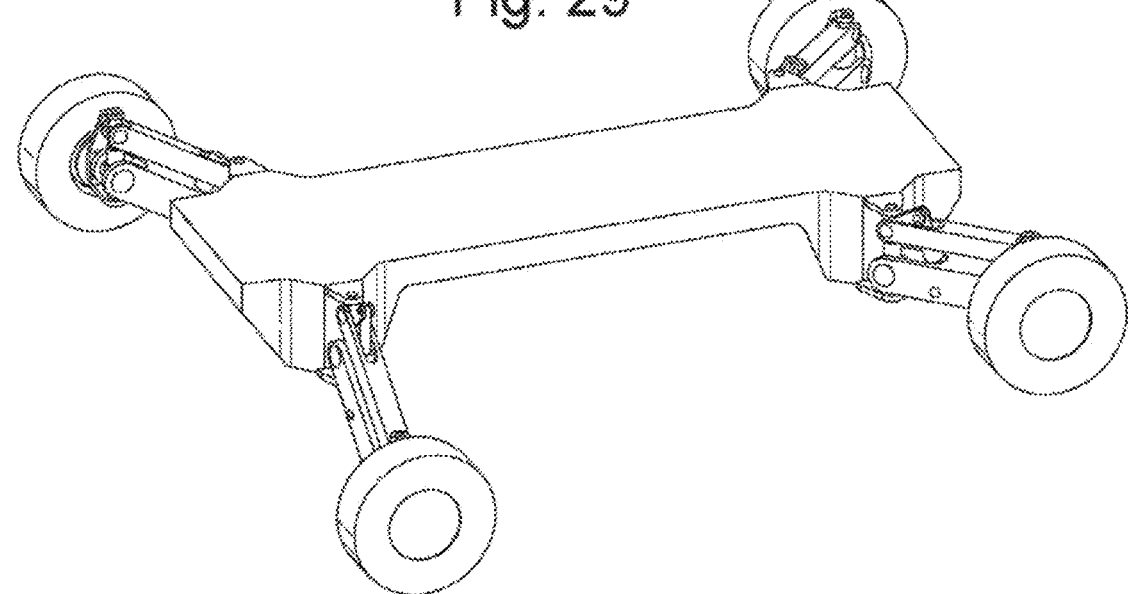
Figure 30:
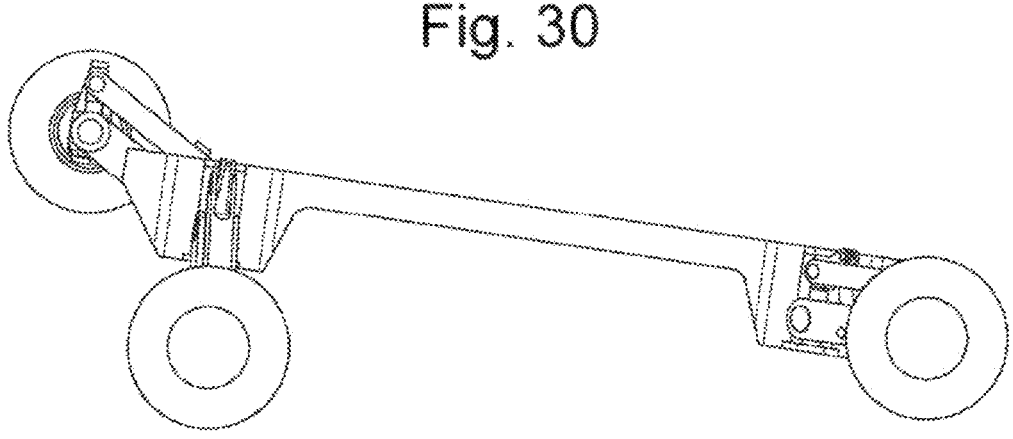
Figure 31:
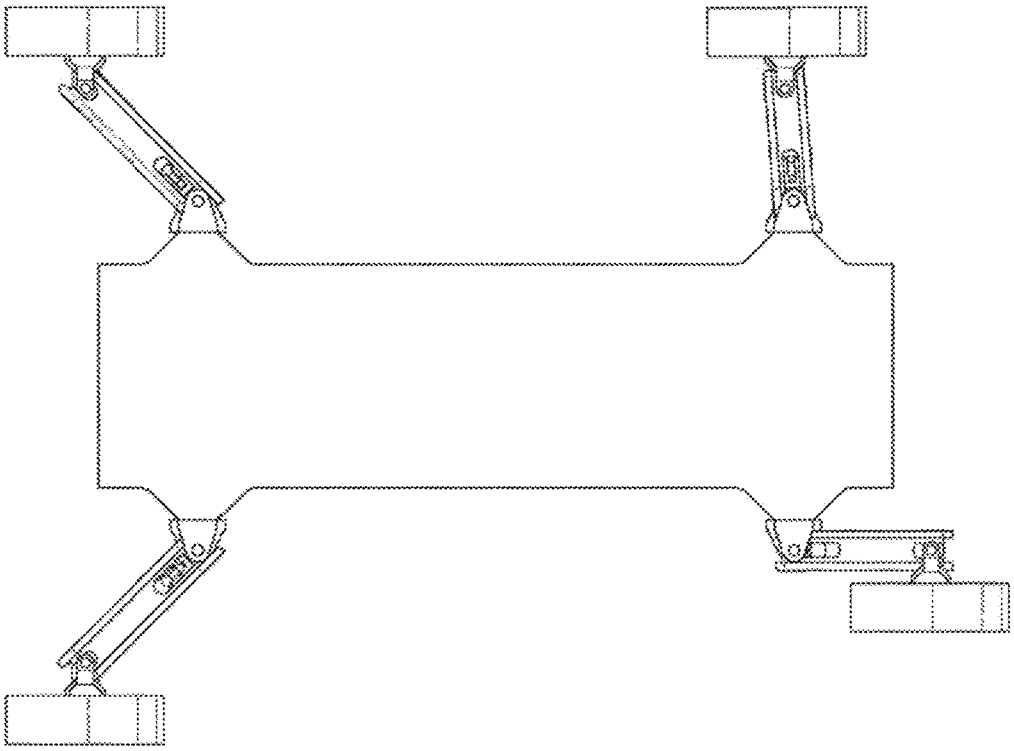
Figure 32:
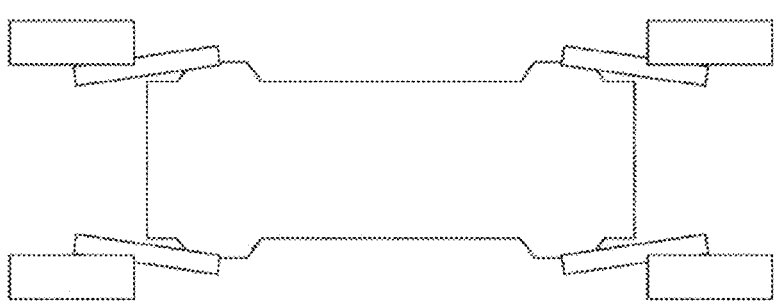
FIGS. 32 to 36 illustrate a narrow gap mode of operation of the suspension system.
Figure 33:
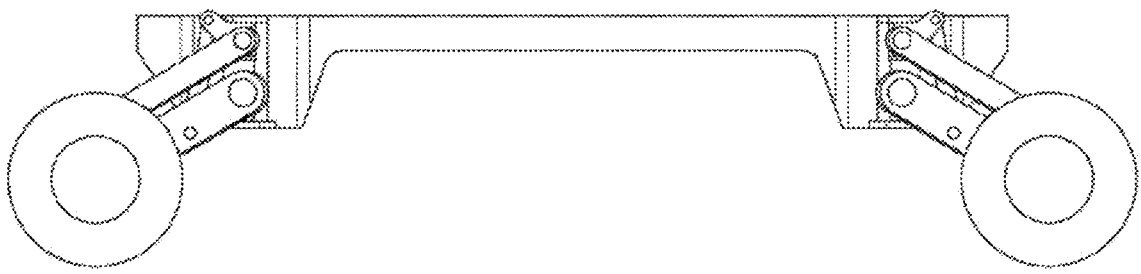
Figure 34:
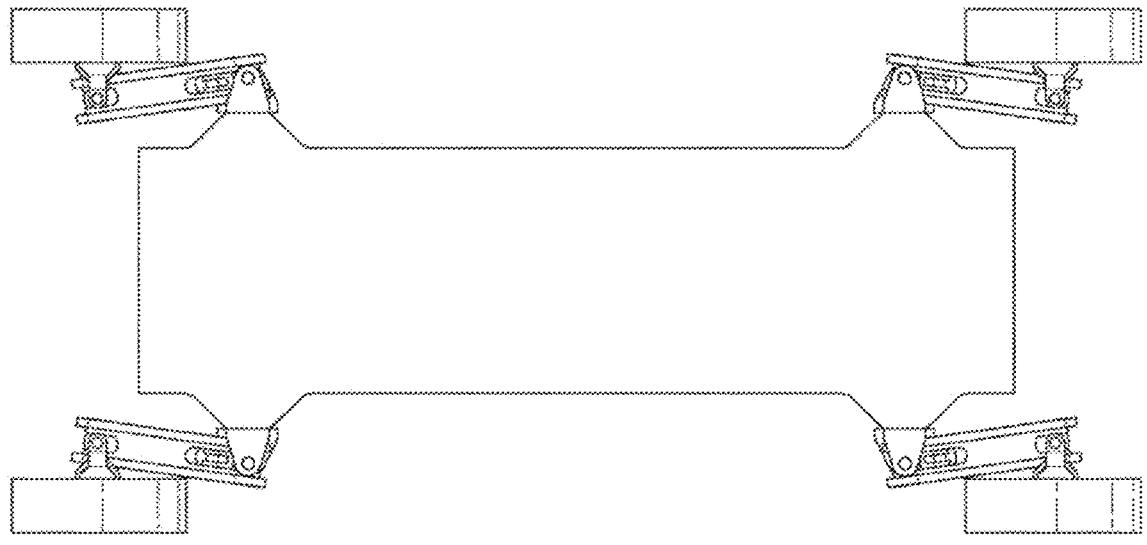
Figure 35:
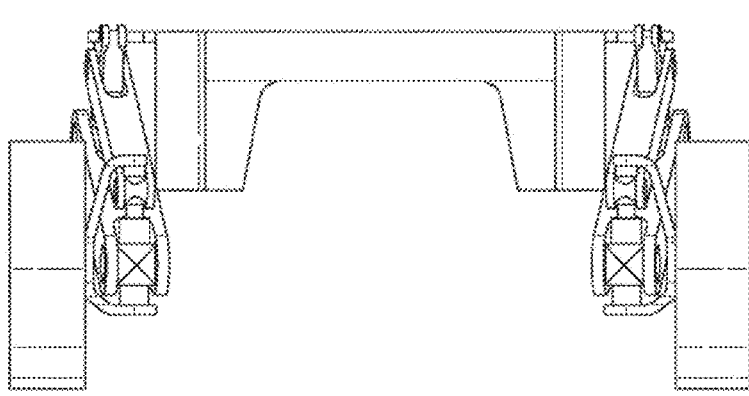
Figure 36:
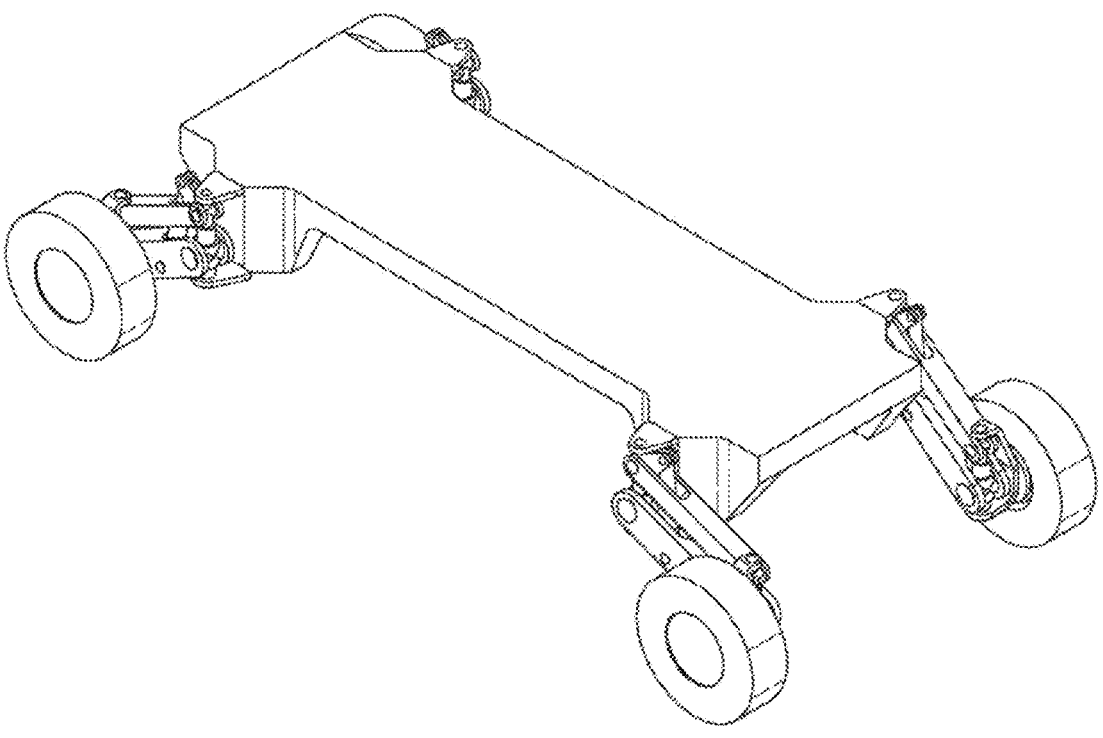
Figure 37:
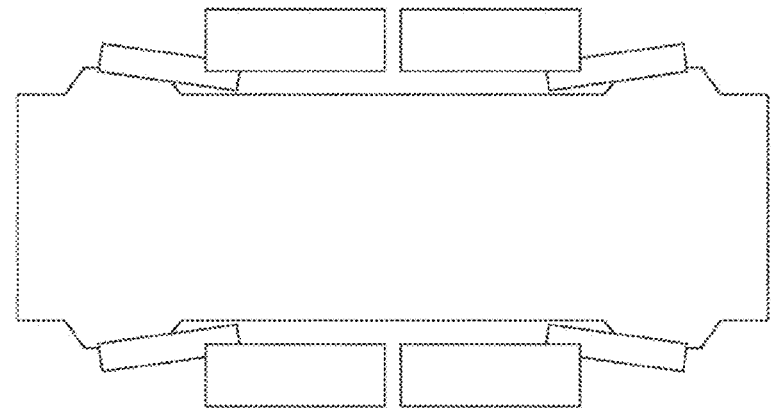
FIGS. 37 to 41 illustrate a storage mode of operation of the suspension system.
Figure 38:
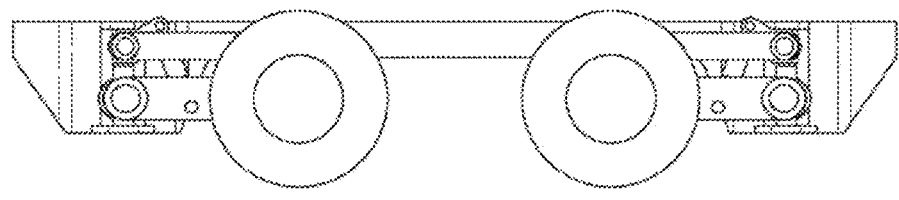
Figure 39:
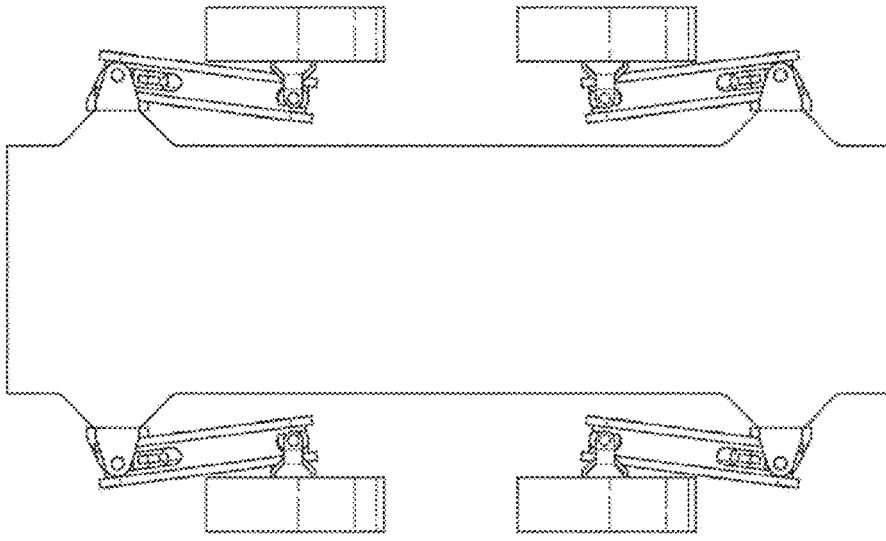
Figure 40:
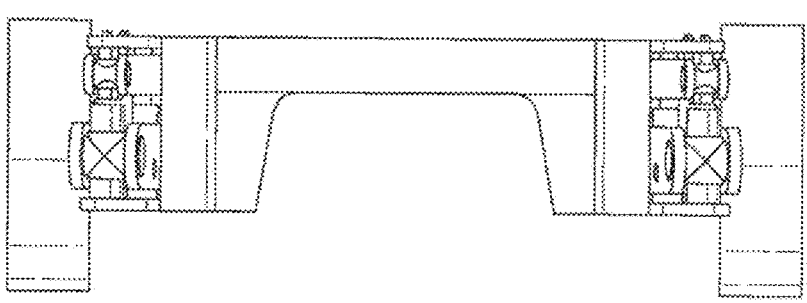
Figure 41:
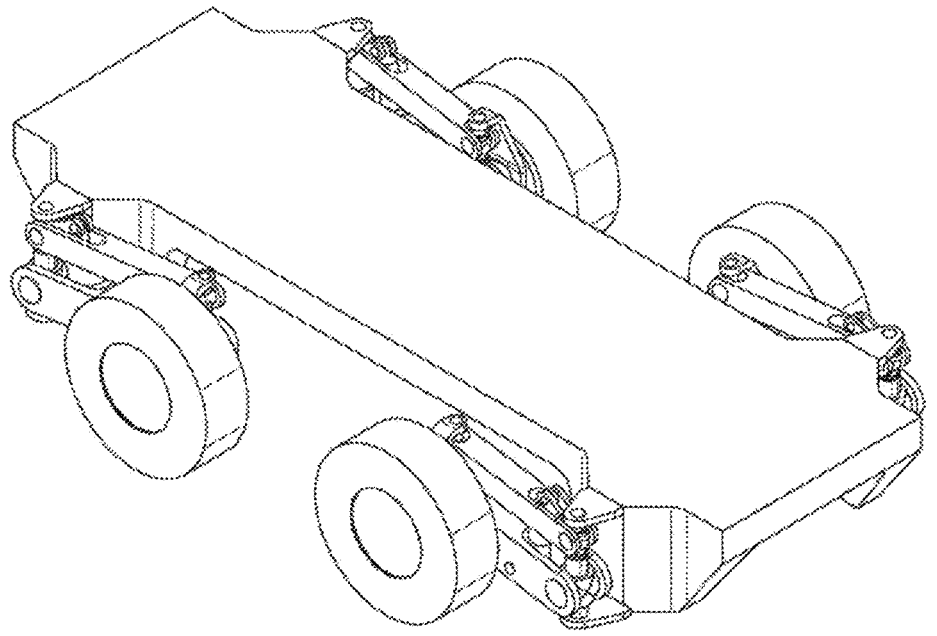
Figure 42:
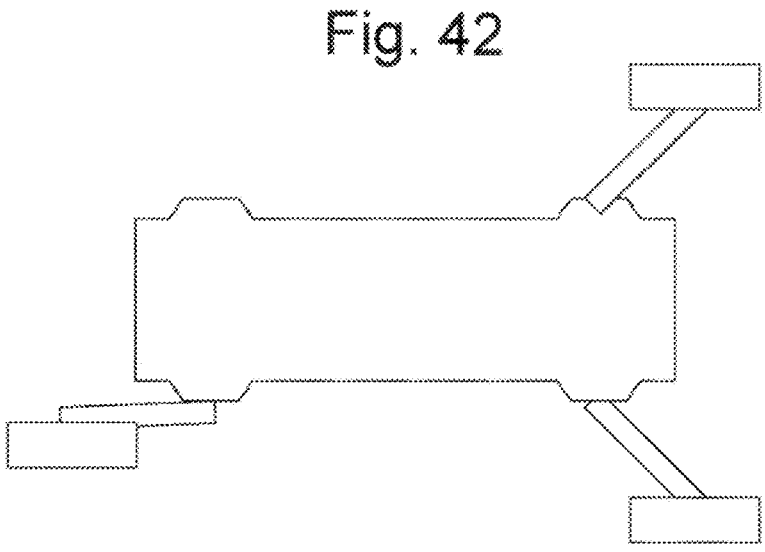
FIGS. 42 to 45 illustrate a reversionary mode of operation of the suspension system.
Figure 43:
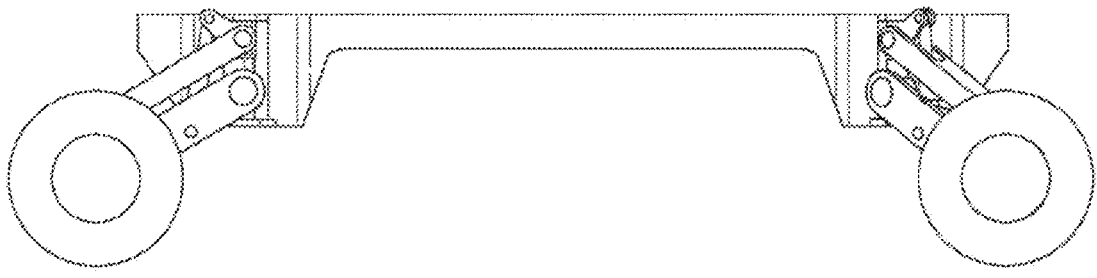
Figure 44:
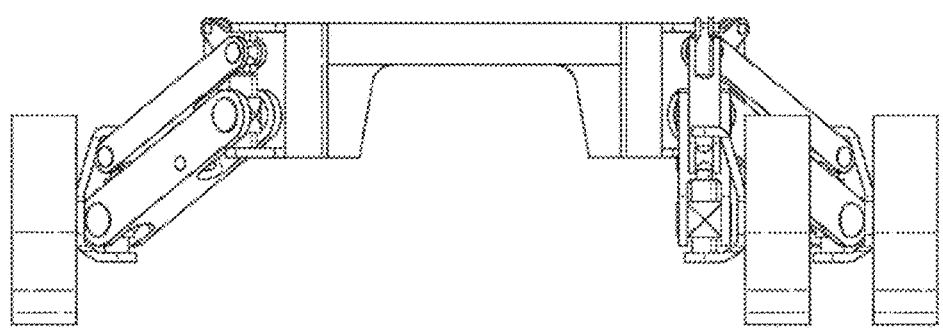
Figure 45:
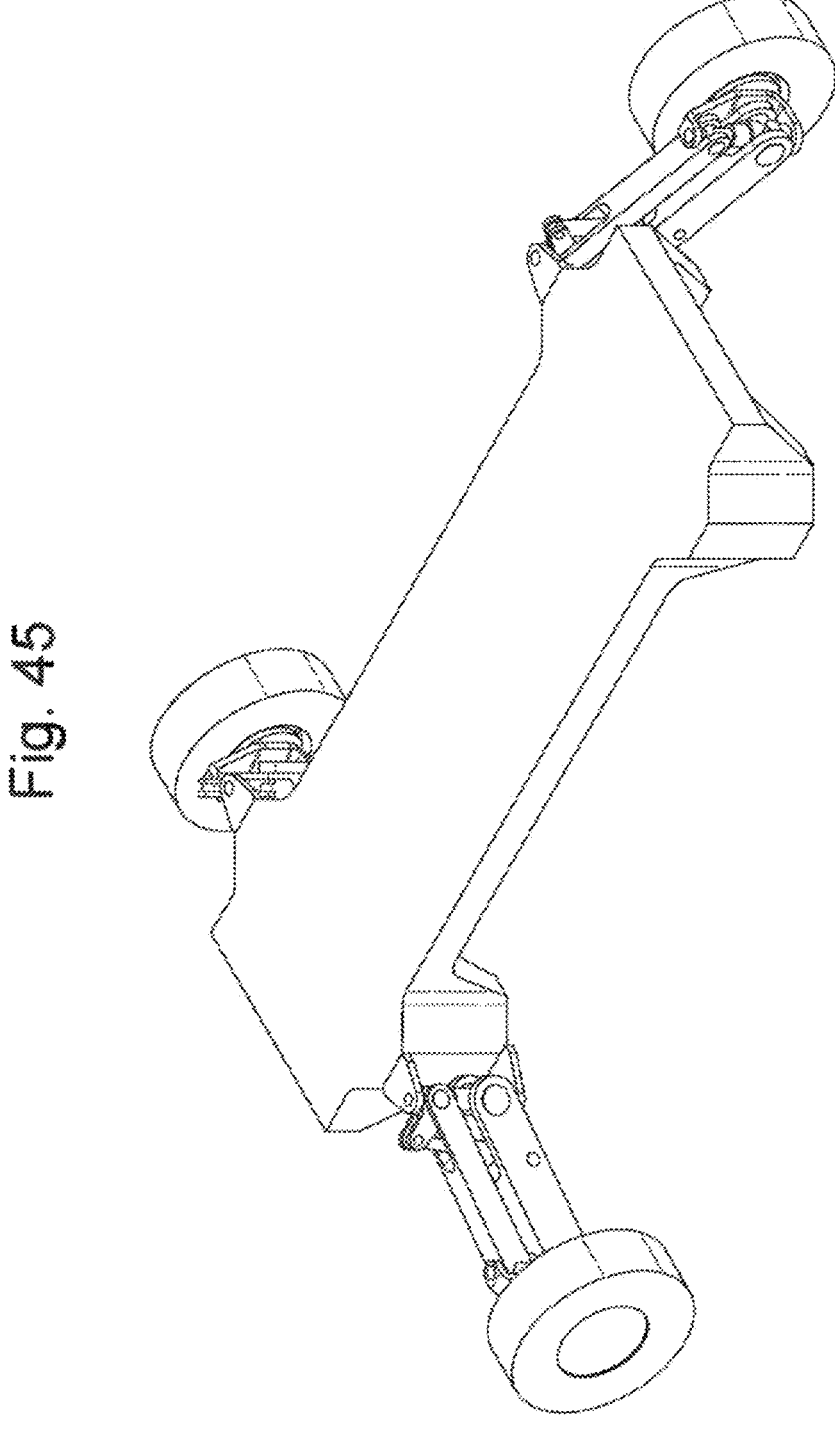
Figure 46:
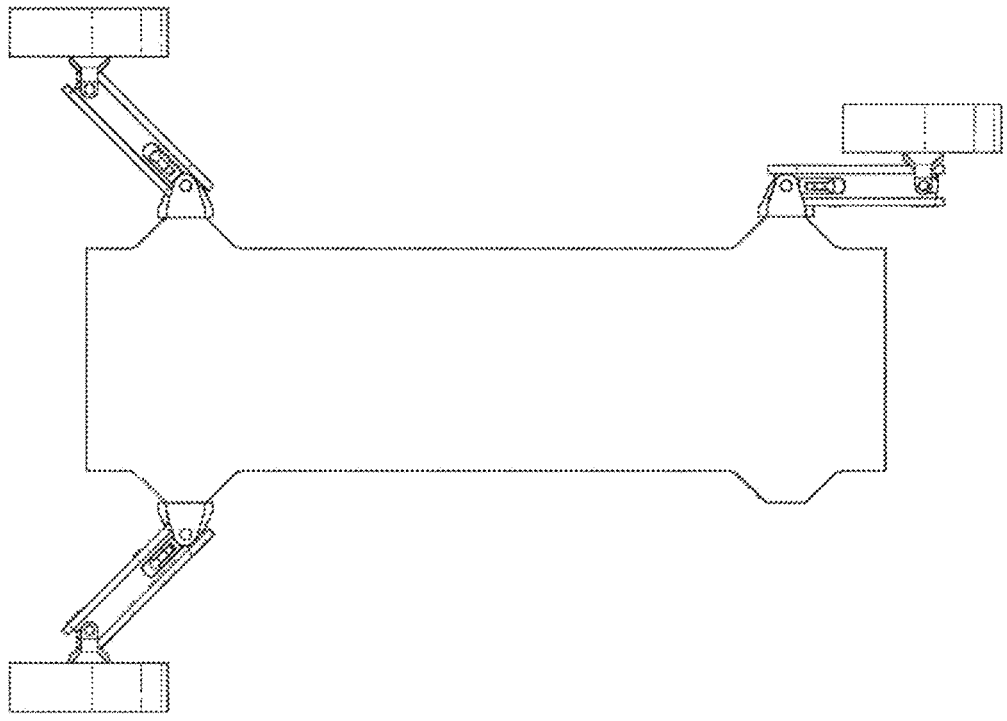

As illustrated in FIGS. 6 to 8, the chassis 200 and/or vehicle 100 extends along an x-axis, a first end 202 of the chassis 200 and a second end 204 of the chassis 200 spaced apart from one another along the x-axis. The chassis 200 also extends along a y-axis, a first side 206 of the chassis 200 and a second side 208 of the chassis 200 spaced apart from one another along the y-axis. The x-axis is at right angles to the y-axis.

The x-axis defines a chassis roll axis 210. The y-axis defines a chassis pitch axis 212. A z-axis defines a chassis yaw axis 214, the z-axis being perpendicular to the x-axis and y-axis.

As shown in FIGS. 6 to 8, the chassis 200 defines a mounting position 240 for a wheel arm chassis mounting member 414 of a suspension unit 442 of the suspension system 400, a suspension unit 442 being coupled to a mounting position 240. That is, the suspension system 400 comprises at least one suspension unit 442. In the example shown, the chassis 200 defines a plurality of mounting positions 240 for a wheel arm chassis mounting member 414, the mounting positions 240 spaced around the periphery of the chassis 200, at least some of the mounting positions 240 being coupled to a respective suspension unit 442.

In the examples shown the chassis 200 defines a substantially polygonal periphery, the mounting positions 240 being provided proximate to, or at, each corner of the chassis 200. In the example shown, the chassis 200 defines a substantially four sided polygonal periphery, and defines mounting positions 240 for wheel arm chassis mounts 220 on opposite sides 206, 208 of the chassis 200. However, other shapes of the chassis 200 may be provided. The mounting positions 204 and/or chassis mounts 220 may extend away from the main body of the chassis 200 (for example provided as structural boss) to space the point of connection with the suspension unit 442 away from the sides 206, 208 of the chassis 200.

In the example shown a suspension unit 442 is provided towards (although not necessarily at) each corner of the chassis 200. Hence in the example shown there are provided four suspension units 442. In other examples the vehicle 100 may be fitted with more than four suspension units. The vehicle is provided with at least one suspension unit 442.

The suspension system 400 is configured to support the chassis 200 of the vehicle 100 above a support surface (e.g. the ground, a track, road or other surface).

As shown in FIGS. 1 to 5 and FIGS. 6 to 8, the suspension unit 442 comprises a wheel arm assembly 444 comprising a first wheel arm 402 having a chassis mount end 410 which in use is adjacent to the chassis 200, and a wheel mount end 412 to which may be attached a wheel 404 for supporting the chassis 200.

As shown in FIGS. 1 to 5 the chassis mount end 410 of the first wheel arm 402 may be provided with a chassis mounting member 414 (e.g. a bracket for attaching to the chassis 200), the chassis mount end 410 of the first wheel arm 402 and chassis mounting member 414 being pivotable relative to one another around a chassis mount pivoting axis 230. As illustrated in FIG. 9, the chassis mounting member

414 is configured to support (e.g. couple with) the chassis mount end 410 of the first wheel arm 402 so that the first wheel arm 402 and chassis mounting member 414 are operable to pivot at least 180 degrees relative to one another about the chassis mount pivoting axis 230. That is to say, the chassis mounting member 414 is configured to couple with the chassis mount end 410 of the first wheel arm 402 so that the first wheel arm 402 and chassis mounting member 414 are operable to pivot at least 180 degrees relative to one another about the chassis mount pivoting axis 230.

Also as shown in FIGS. 1 to 5, the wheel mount end 412 of the first wheel arm 402 is provided with a wheel mounting member 416 (for example a knuckle for attaching to a wheel), the wheel mount end 412 of the first wheel arm 402 and wheel mounting member 416 being pivotable relative to one another around a wheel mount pivoting axis 432. As illustrated in FIG. 10, the wheel mounting member 416 is configured to support (e.g. couple with) the wheel mount end 412 of the first wheel arm 402 so that the first wheel arm 402 and wheel mounting member 416 are operable to pivot at least 180 degrees relative to one another about the wheel mount pivoting axis 432.

Figure 1:
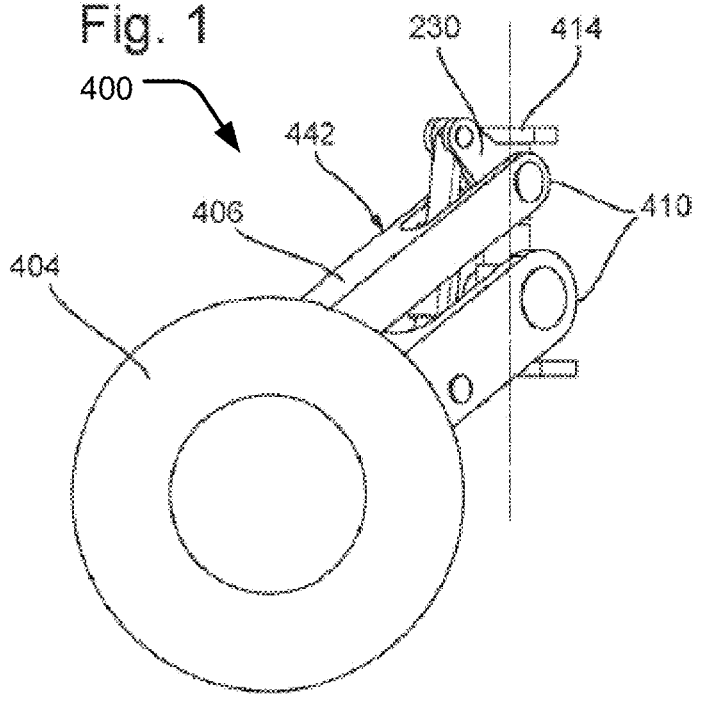
FIGS. 1 to 5 show a suspension unit, according to the present disclosure, from various angles.
Figure 2:
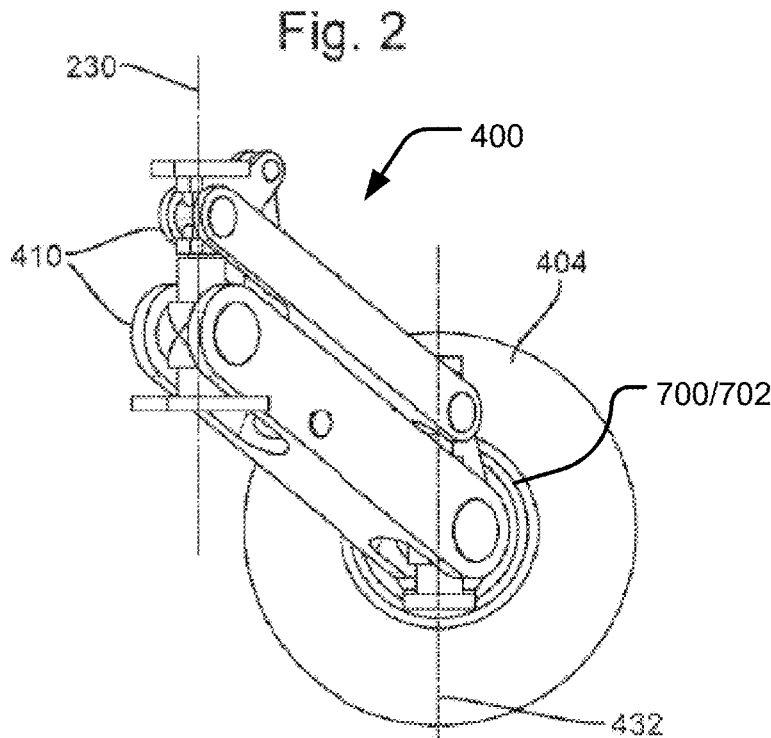
Figure 3:
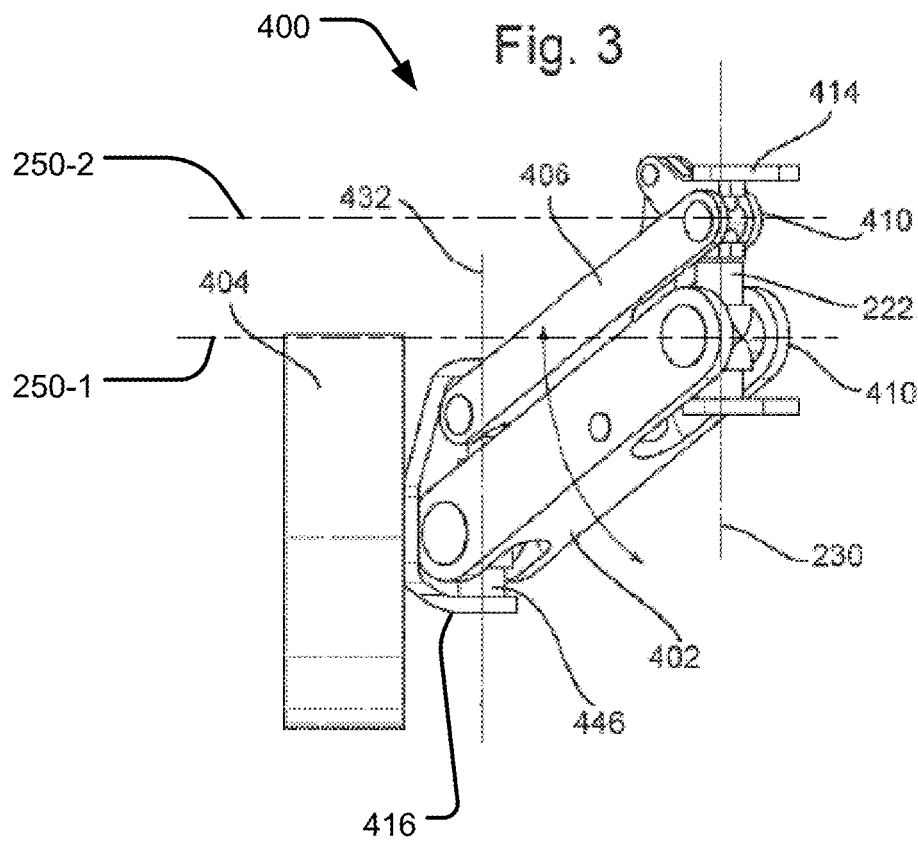
Figure 4:
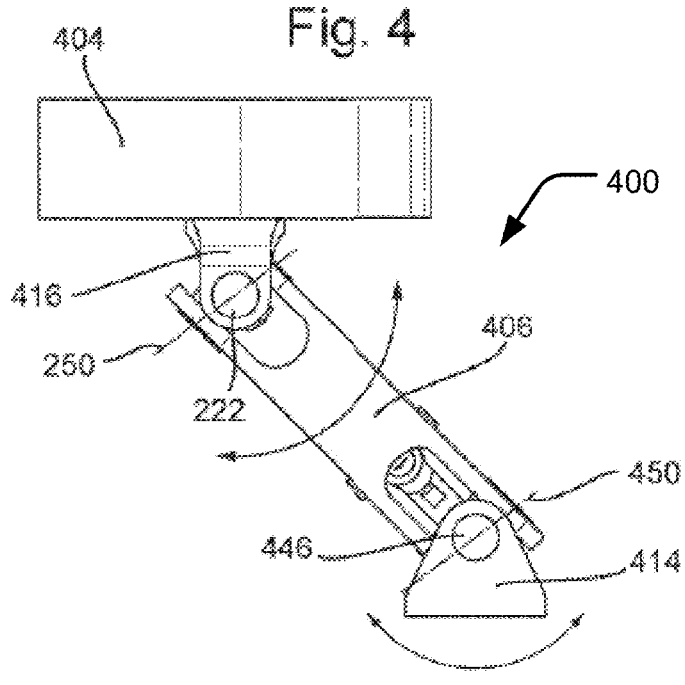

As shown in FIG. 4, a chassis end trunnion 222 is provided at (e.g. coupled to) the chassis mount end 410 of the first wheel arm 402, the chassis end trunnion 222 pivotably attached to the chassis mounting member 414, the chassis end trunnion 222 and chassis mounting member 414 being pivotable relative to one another around the chassis mount pivoting axis 230. The chassis mounting member 414 is configured to support (e.g. couple with) the chassis mount end 410 of the first wheel arm 402 via the chassis end trunnion 222 such that a clearance is maintained around the chassis mount end 410 of the first wheel arm 402. That is to say, a clearance is maintained between the chassis mount end 410 of the first wheel arm 402 and the chassis mounting member 414 and/or chassis 200 to provide a space for the chassis mount end 410 of the first wheel arm end 412 to move through. The chassis end trunnion 222 is centred on, and pivotable about, the chassis mount pivoting axis 230.

As shown in FIG. 4, a wheel end trunnion 446 provided at (e.g. coupled with) the wheel mount end 412 of the first wheel arm 402, the wheel end trunnion 446 is pivotably attached to the wheel mounting member 416, the trunnion and wheel mounting member 416 being pivotable relative to one another around the wheel mount pivoting axis 432. The wheel mounting member 416 is configured to support (e.g. couple with) the wheel mount end 412 of the first wheel arm 402 via the wheel end trunnion 446 such that a clearance is maintained around the wheel mount end 412 of the first wheel arm 402 to provide a space for the wheel mount end 412 of the first wheel arm 402 to move through. That is to say, a clearance is maintained between the wheel mount end 412 of the first wheel arm 402 and the wheel mounting member 416 and/or wheel 404 to provide a space for the wheel mount end 412 of the first wheel arm 402 to move through.

The wheel end trunnion 446 is centred on, and pivotable about, the wheel mount pivoting axis 432. The chassis mount pivoting axis 230 is parallel to the wheel mount pivoting axis 432. The chassis mount pivoting axis 230 may be aligned with (e.g. parallel to) the z-axis.

As shown in the figures, the wheel arm assembly 444 may comprise a second wheel arm 406, the second wheel arm 406 having a chassis mount end 410 and a wheel mount end 412. That is to say, the first wheel arm 402 and second wheel arm 406 define the chassis mount end 410 and the wheel mount end 412 of the wheel arm assembly 444.

The chassis mount end 410 of the second wheel arm 406 and chassis mounting member 414 are pivotable relative to one another around the chassis mount pivoting axis 230. The chassis mounting member 414 is configured to support the chassis mount end 410 of the second wheel arm 406 so that the second wheel arm 406 and chassis mounting member 414 are operable to pivot at least 180 degrees relative to one another about the chassis mount pivoting axis 230.

The wheel mount end 412 of the second wheel arm 406 and wheel mounting member 416 are pivotable relative to one another around the wheel mount pivoting axis 432, and the wheel mounting member 416 is configured to support the (e.g. couple with) the wheel mount end 412 of the second wheel arm 406 so that the second wheel arm 406 and wheel mounting member 416 are operable to pivot at least 180 degrees relative to one another about the wheel mount pivoting axis 432.

The chassis end trunnion 222 is coupled to the chassis mount end 410 of the second wheel arm 406, and the chassis mounting member 414 is configured to support (e.g. couple with) the chassis mount end 410 of the second wheel arm 406 via the chassis end trunnion 222 such that a clearance is maintained around the chassis mount end 410 of the second wheel arm 406 to provide a space for the chassis mount end 410 of the second wheel arm 406 end to move through. That is to say, a clearance is maintained between the chassis mount end 410 of the second wheel arm 406 and the chassis mounting member 414 and/or chassis 200 to provide a space for the chassis mount end 410 of the second wheel arm 406 end to move through.

The wheel end trunnion 446 is coupled to the wheel mount end 412 of the second wheel arm 406, and the wheel mounting member 416 is configured to support the (e.g. couple with) the wheel mount end 412 of the second wheel arm 406 via the wheel end trunnion 446 such that a clearance is maintained around the wheel mount end 412 of the second wheel arm 406. That is to say, a clearance is maintained between the wheel mount end 412 of the second wheel arm 406 and the wheel mounting member 416 and/or wheel 404 to provide a space for the chassis mount end 410 of the second wheel arm 406 end to move through. The (or each) wheel 404 for supporting the chassis 200 is rotatably coupled to its respective wheel arm 402 via the wheel mounting member 416. Hence the first wheel arm 402 and second wheel arm 406 and wheel 404 are operable to pivot at least 180 degrees relative to one another about the wheel mount pivoting axis 432.

Figure 5:
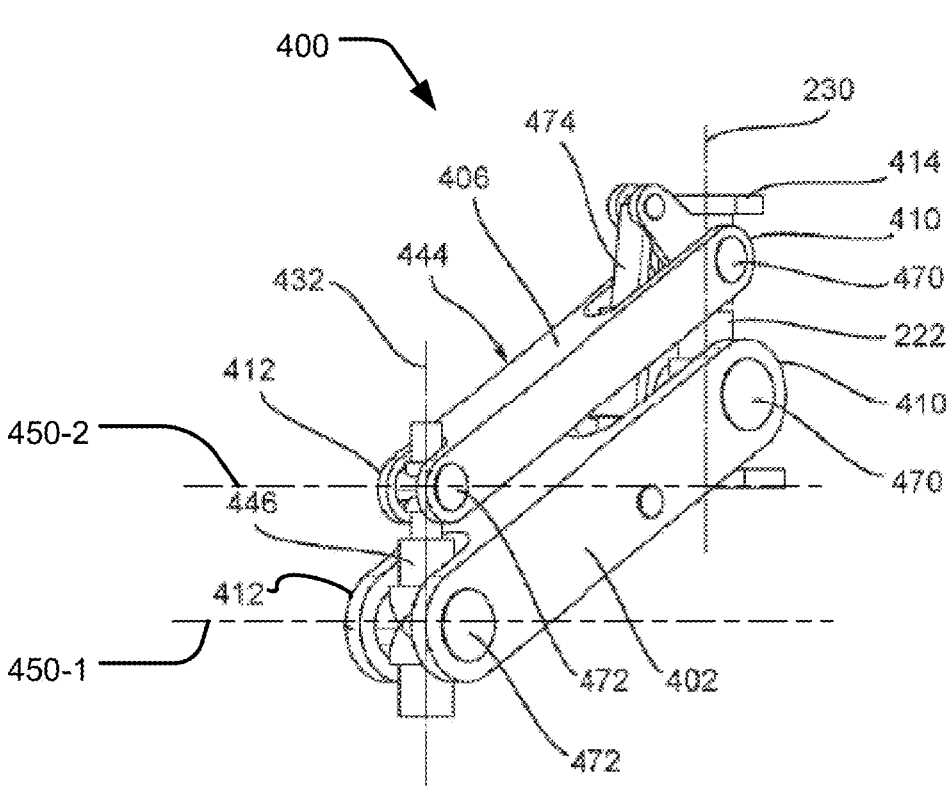

As shown in FIG. 5, a first actuator 470 may be coupled to the first wheel arm 402, second wheel arm 406 and/or chassis mounting member 414 and operable to cause the pair of wheel arms 402, 406 and chassis mounting member 414 to pivot relative to one another around the chassis mount pivoting axis 230. A second actuator 472 may be coupled to the first wheel arm 402, second wheel arm 406 and/or wheel mounting member 416 and operable to cause the pair of wheel arms 402, 406 and wheel mounting member 416 to pivot relative to each other around the wheel mount pivoting axis 432.

That is to say, the first wheel arm 402 and second wheel arm 406 may be mounted to the chassis mount 220 and/or chassis mounting position 240 (for example via the chassis mounting member 414) such that the first wheel arm 402 and second wheel arm 406 are operable to pivot at least 180 degrees relative to the chassis mount 220 and/or chassis mounting position 240. The chassis mounting member 414 and wheel arms 402, 406 may be operable to pivot at least 180 degrees but no more than 200 degrees relative to one another. The chassis mounting member 414 and wheel arms 402, 406 may be operable to pivot at least 180 degrees but no more than 190 degrees relative to one another. For example, the chassis mounting member 414, chassis mount 220 and/or chassis mounting position 240 may space the chassis end of the wheel arms 402, 406 apart from the side of the chassis 200 so that the wheel arms 402, 406 may be parallel to the chassis 200 (e.g. extending parallel to the x-axis and/or extending in a direction having a component in a direction parallel to the x-axis), or allow the wheel arms 402, 406 to extend from their chassis mount end towards the chassis 200 (e.g. angled 95 degrees relative to the y-axis and/or extending in a direction having a component in a direction angled 95 degrees to the y-axis). The wheel arms 402, 406 and chassis mount 220 may be pivotable relative to one another around an axis parallel to the z axis and/or around a vertical axis. Each chassis mounting member 414 may comprise a universal joint.

Put another way, the ability of the wheel arms 402, 406 to fold against the chassis 200 (e.g. extending parallel to the x-axis and/or extending in a direction having a component in a direction parallel to the x-axis) and to extend from their chassis mount end towards the chassis 200 (e.g. angled 95 degrees relative to the y-axis and/or extending in a direction having a component in a direction angled 95 degrees to the y-axis) may in part be enabled by the mounting positions 204 and/or chassis mounts 220 extending away from the main body of the chassis 200 (for example provided as structural boss) to space the point of connection with the suspension unit 442 away from the sides 206, 208 of the chassis 200.

The mounting positions 240 for the wheel arm chassis mounting member 414 are spaced apart, and the components of the suspension units 442 are configured such that throughout range of motion of the pairs of wheel arms 402, 406 and wheels 404, any one of the suspension units 442 remains spaced apart from any one of the other pair of wheel arms 402, 406 and wheels 404 of another suspension units 442.

Each wheel mounting member 416 is configured to couple with the wheel mount end 412 of the wheel arms 402, 406 so that the wheel arms 402, 406 and wheel mounting member 416 (and hence wheel 404) are operable to pivot at least 180 degrees relative to one another about the wheel mount pivoting axis 432. Each pair of wheel arms 402, 406 and respective wheel mounting member 416 (and hence wheel 404) may be operable to pivot at least 180 degrees but no more than 200 degrees relative to one another about the wheel mount pivoting axis 432. Each pair of wheel arms 402, 406 and respective wheel mounting member 416 (and hence wheel 404) may be operable to pivot at least 180 degrees but no more than 190 degrees relative to one another about the wheel mount pivoting axis 432. Each wheel mounting member 416 may comprise a universal joint 420.

The chassis mount pivoting axis 230 may be parallel to the wheel mount pivoting axis 432. The chassis mount pivoting axis 230 may be aligned with (e.g. parallel to) the z-axis.

As shown in FIGS. 1 to 5, the suspension system 400 may further comprise a third actuator 474, wherein one end of the third actuator 474 is coupled to the first wheel arm 402 (and/or second wheel arm 406) and the other end of the third actuator 474 is coupled to the chassis mounting member 414.

The chassis mount ends 410 of the first wheel arm 402 and second wheel arm 406 are rotatably mounted to the chassis end trunnion 222 such that the first wheel arm 402 and second wheel arm 406 may each rotate about a respective chassis suspension axis 250 which extend at right angles to the chassis mount pivoting axis 230, as indicated in FIG. 4. That is to say, the first wheel arm 402 is rotatable about a first chassis suspension axis 250-1, and the second wheel arm 406 is rotatable about a second chassis suspension axis 250-2, wherein the first chassis suspension axis 250-1 is offset from and parallel to the second chassis suspension axis 250-2.

The wheel mount ends 412 of the first wheel arm 402 and second wheel arm 406 are rotatably mounted to the wheel end trunnion 446 such that the first wheel arm 402 and second wheel arm 406 may each rotate about a respective wheel suspension axis 450 which extend at right angles to the wheel mount pivoting axis 432, as indicated in FIG. 4. That is to say, the first wheel arm 402 is rotatable about a first wheel suspension axis 450-1, and the second wheel arm 406 is rotatable about a second wheel suspension axis 450-2, wherein the second wheel suspension axis 450-1 is offset from and parallel to the second wheel suspension axis 450-2.

The third actuator 474 may be operable to move the first wheel arm 402 and second wheel arm 406 from a first position relative to the chassis 200 to a second position relative the chassis 200 to thereby alter the height of the chassis 200 from a support surface on which it stands. The third actuator 474 may also be operable as a spring damper, and may comprise a hydro strut, magneto rheological damper or other appropriate damper solution. That is to say, the third actuator 474 is operable to pivot the first wheel arm 402 and second wheel arm 406 relative to the chassis 200 about the chassis suspension axes 250-1, 250-2 (that is, an axis which is aligned with and/or parallel to a plane defined by the x-axis and y-axis, as illustrated in FIGS. 6, 8, 10, 11). The arrangement is configured such that the first wheel arm 402 and second wheel arm 406 may rotate relative to the wheel mounting member 416 about the wheel suspension axes 450-1, 450-2.

The first wheel arm 402 and second wheel arm 406 are mounted relative to each other, as set out above, such that the first wheel arm 402 and second wheel arm 406 remain parallel to one another as the height of the chassis 200 from a support surface (i.e. ride height) is varied.

Hence the suspension system 400 comprises a pair of long cantilever style wheel arms 402, 406. The wheel arms 402 are mounted to the chassis 200 via a pair of actuated universal joints 470, 472 on shafts 222, 446. This joint allows motion of ~±95° from the neutral position, i.e. perpendicular to the vehicle 100.

At the wheel assembly end 412 the wheel 404 is mounted via an actuated knuckle 416 on the second shaft 222. This joint allows motion of ~±95° from the neutral position i.e. perpendicular to the vehicle 100 (i.e. aligned with and/or parallel to the y-axis).

Vertical motion is actuated, resisted and controlled (as required in a given scenario) by the integrated spring damper assembly 474. This joint allows motion of ~±45° from the horizontal position.

At least one wheel 404 is coupled to a drive system 700 to rotate the or each wheel 404 relative to its respective wheel arm 402 to thereby move the chassis 200 from one location to another.

The mounting arrangement of the first wheel arm 402 and second wheel arm 406 allows for the wheel orientation relative to the chassis 200 to be maintained as the wheel arms 402, 406 are raised or lowered by the third actuator 474.

The wheel drive system 700 comprises an actuator 702 coupled to the wheel 404, wherein each wheel drive actuator 702 is operable independently of each other wheel drive actuator 702.

There may be provided a method of control of operating the suspension system 400 of the present disclosure. The method may comprise the steps of operating the first actuator 470 to move the first wheel arm 402 and chassis mounting member 414 relative to one another about the chassis mount pivoting axis 230 and operating the second actuator 472 to move the first wheel arm 402 and wheel mounting member 416 relative to one another about the wheel mount pivoting axis 432. The first actuator 470 and second actuator 472 may be controlled to operate (that is, are operable) independently of one another.

The method of operation may comprise the steps of operating the third actuator 474 to move the first wheel arm 402 from a first position relative to the chassis 200 to a second position relative to the chassis 200 to thereby alter the height of the chassis 200 from a support surface on which it stands (i.e. move the wheel 404 in a direction having a component in the z-axis). The third actuator 474 may be controlled to operate (that is, is operable) independently of the first actuator 470 and second actuator 472.

In an example, as shown in the figures, when four of suspension units 442 are combined onto a suitable vehicle chassis 200, a significant range of functionality is enabled, providing benefits over the prior art.

For example, the arrangement of the present disclosure enables a combination of modes of operation not possible with solution solutions of the related art, including:

a. a standard travel mode (as shown in FIGS. 9, 10, 11) in which in which the wheel arm assemblies 444 are extended and angled away from the chassis 200, with the wheels 404 aligned with the direction or of travel and/or used for turning the vehicle;

b. a slope traverse mode (as shown in FIGS. 12 to 16) in which the wheel arm assemblies 444 on one side of the chassis 200 are extended and elevated relative to the chassis 200 more than on the other side of the chassis 200, such that the vehicle 100 can traverse slopes whilst maintaining the chassis level (or at least closer to level);

c. a turn on the spot mode (as shown in FIGS. 17 to 21) in which the wheels 404 are angled relative to one another to direct the vehicle 100 to rotate about the z-axis (e.g. can be steered/rotated on the spot without skid steering);

d. a gap crossing mode (as shown in FIGS. 22 to 26) in which by the use of a suitable series of operations wide gaps can be crossed, for example by approaching the gap at ~45° with the leading wheel arm assembly 444 raised, then straighten up the vehicle and repeat for the trailing wheels);

e. a step climb mode (as shown in FIGS. 27 to 31) in which by the use of a suitable series of operations large steps (larger than ~½ wheel diameter) can be climbed, approaching the step with a leading wheel arm assembly 444 raised;

f. a narrow gap mode (as shown in FIGS. 32 to 36) in which the wheel arm assemblies 444 are drawn in close to alignment with the edge of the chassis 200, with the front wheel arm assembly 444 extending forwards ahead of the chassis and the rear wheel arm assembly 444 extending backwards behind the chassis. In this configuration the vehicle 100 can pass through narrower gaps than the standard running width (as shown in FIGS. 9 to 11) would allow by over rotating the wheel arm assemblies 444;

g. a storage mode (as shown in FIGS. 37 to 41) in which the wheel arm assemblies 444 are drawn in close to alignment with the edge of the chassis 200, with the front wheel arm assembly 444 extending backwards and the rear wheel arm assembly 444 extending forwards such that the vehicle 100 can be stored/transported in a smaller space by folding in the wheels;

h. a reversionary mode (as shown in FIGS. 42 to 45) in which, when one of a pair of wheel arm assemblies 444 (for example one of the front or the rear wheel arm assemblies) is removed or damaged, the remaining wheel arm assembly 444 of the pair is drawn in close to the chassis, extending away from the end of the chassis it is proximate to such that the vehicle 100 is still balanced and drivable (albeit at a much reduced speed);

i. a walking mode, for example should the entire wheel drive system 700 be disabled/terrain be too rough to traverse by driving a wheel across it a "walk mode" is possible where the wheel arm assembly 444 lift and move each wheel individually.

Additionally, the lateral stability of the vehicle 100 can be improved by maximizing the spacing between wheels (maximizing the wheel base) (not shown). Raising all suspension units 442 to their maximum height can enhance ground clearance for rough terrain/ridge cresting without risk of grounding out the chassis. Lowering all the suspension units 442 to a minimum may allow the vehicle 100 to duck under lower objects.

The height of the wheel relative to the vehicle 100 can be controlled independently at each wheel. Individual wheels can be raised off the ground. The angle of each wheel arm 402 relative to the vehicle 100 direction of travel can be varied from an over-rotated leading arm to an over rotated trailing arm. The angle of the wheel relative to the wheel arm 402 and/or chassis 200 can be fully rotated so that any wheel direction can be achieved without repositioning the vehicle 100.

The arrangement allows for an agile and lightweight vehicle platform solution since stability can be provided by extending the wheels 404 of the vehicle 100 away from the chassis, thereby providing a small platform that can be made stable by relative positioning of the chassis 200 and wheel arm assembly 444.

The modular design allows the same assembly to be used on all locations of the vehicle 100 reducing manufacturing and maintenance costs.

Additionally the many modes of operation which are provided by the suspension unit 442 provide for an agile and versatile platform that is configured to remain operational in a wide range of scenarios.

A significant advantage of the suspension system 400 of the present disclosure is that the provision of suspension units 442 provides a substantially modular solution, in that a single design of suspension unit 442 can be provided in all locations on a vehicle 100. This simplifies manufacture, assembly, control and maintenance.

Another advantage of the suspension system is that, when fitted to a vehicle 100, the vehicle 100 may be towed by and or follow any vehicle without issue by matching the wheelbase of the leading vehicle. Wheelbase matching is often a significant limitation on vehicles intended to be towed or used in a convoy as the following vehicle 100 has to be able to drive in the ruts left by the leading vehicle 100 (on surfaces such as snow or mud).

Although it would be possible for a vehicle to comprise more than four wheel arm assemblies 230 (i.e. with a pair at the front and pair at the back), the need to maintain the chassis length within a certain limit to provide manoeuvrability, means that any more than two pairs of wheel arm assemblies may result in a chassis having an impractical length since each wheel arm assembly 444 needs to be able to pivot at least 180 relative to the chassis 200, meaning that the greater the number of wheel arm assemblies 444, the greater the length of chassis required. Hence a system comprising four wheel arm assemblies 444 may be optimum.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A suspension system for supporting a chassis of a vehicle, the suspension system comprising a suspension unit, the suspension unit comprising:

a wheel arm assembly comprising a first wheel arm having a chassis mount end and a wheel mount end;

the chassis mount end of the first wheel arm being pivotably attached to a chassis mounting member via a chassis end trunnion, the chassis mount end of the first wheel arm and the chassis mounting member being pivotable relative to one another around a chassis mount pivoting axis, and the chassis mounting member configured to support the chassis mount end of the first wheel arm so that the first wheel arm and the chassis mounting member are operable to pivot at least 180 degrees relative to one another about the chassis mount pivoting axis; and the wheel mount end of the first wheel arm being pivotably attached to a wheel mounting member via a wheel end trunnion, the wheel mount end of the first wheel arm and the wheel mounting member being pivotable relative to one another around a wheel mount pivoting axis, and the wheel mounting member is configured to couple with the wheel mount end of the first wheel arm so that the first wheel arm and the wheel mounting member are operable to pivot at least 180 degrees relative to one another about the wheel mount pivoting axis.

2. The suspension system of claim 1, wherein the chassis end trunnion is provided at the chassis mount end of the first wheel arm, the chassis end trunnion being pivotably attached to the chassis mounting member, the chassis end trunnion and the chassis mounting member being pivotable relative to one another around the chassis mount pivoting axis, and the chassis mounting member configured to support the chassis mount end of the first wheel arm via the chassis end trunnion such that a clearance is maintained around the chassis mount end of the first wheel arm to provide a space for the chassis mount end of the first wheel arm end to move through.

3. The suspension system of claim 2, wherein the wheel arm assembly comprises a second wheel arm, the second wheel arm having a chassis mount end and a wheel mount end; the chassis mount end of the second wheel arm and the chassis mounting member being pivotable relative to one another around the chassis mount pivoting axis, and the chassis mounting member configured to support the chassis mount end of the second wheel arm so that the second wheel arm and the chassis mounting member are operable to pivot at least 180 degrees relative to one another about the chassis mount pivoting axis; the wheel mount end of the second wheel arm and the wheel mounting member being pivotable relative to one another around the wheel mount pivoting axis, and the wheel mounting member is configured to couple with the wheel mount end of the second wheel arm so that the second wheel arm and the wheel mounting member are operable to pivot at least 180 degrees relative to one another about the wheel mount pivoting axis.

4. The suspension system of claim 3, wherein the chassis end trunnion is coupled to the chassis mount end of the second wheel arm, and the chassis mounting member is configured to support the chassis mount end of the second wheel arm via the chassis end trunnion such that a clearance is maintained around the chassis mount end of the second wheel arm to provide a space for the chassis mount end of the second wheel arm end to move through.

5. The suspension system of claim 1, wherein the wheel end trunnion is provided at the wheel mount end of the first wheel arm, the wheel end trunnion being pivotably attached to the wheel mounting member, the wheel end trunnion and the wheel mounting member being pivotable relative to one another around the wheel mount pivoting axis, and the wheel mounting member is configured to support the wheel mount end of the first wheel arm via the wheel end trunnion such that a clearance is maintained around the wheel mount end of the first wheel arm to provide a space for the wheel mount end of the first wheel arm to move through.

6. The suspension system of claim 5, wherein the wheel arm assembly comprises a second wheel arm, the second wheel arm having a chassis mount end and a wheel mount end; the chassis mount end of the second wheel arm and the chassis mounting member being pivotable relative to one another around the chassis mount pivoting axis, and the chassis mounting member configured to support the chassis mount end of the second wheel arm so that the second wheel arm and the chassis mounting member are operable to pivot at least 180 degrees relative to one another about the chassis mount pivoting axis; the wheel mount end of the second wheel arm and the wheel mounting member being pivotable relative to one another around the wheel mount pivoting axis, and the wheel mounting member is configured to couple with the wheel mount end of the second wheel arm so that the second wheel arm and the wheel mounting member are operable to pivot at least 180 degrees relative to one another about the wheel mount pivoting axis.

7. The suspension system of claim 6, wherein the wheel end trunnion is coupled to the wheel mount end of the second wheel arm, and the wheel mounting member is configured to support the wheel mount end of the second wheel arm via the wheel end trunnion such that a clearance is maintained around the wheel mount end of the second wheel arm to provide a space for the chassis mount end of the second wheel arm end to move through.

8. The suspension system of claim 1, wherein the chassis mount pivoting axis is parallel to the wheel mount pivoting axis.

9. The suspension system of claim 1, wherein the wheel arm assembly comprises a second wheel arm, the second wheel arm having a chassis mount end and a wheel mount end; the chassis mount end of the second wheel arm and the chassis mounting member being pivotable relative to one another around the chassis mount pivoting axis, and the chassis mounting member configured to support the chassis mount end of the second wheel arm so that the second wheel arm and the chassis mounting member are operable to pivot at least 180 degrees relative to one another about the chassis mount pivoting axis; the wheel mount end of the second wheel arm and the wheel mounting member being pivotable relative to one another around the wheel mount pivoting axis, and the wheel mounting member is configured to couple with the wheel mount end of the second wheel arm so that the second wheel arm and the wheel mounting member are operable to pivot at least 180 degrees relative to one another about the wheel mount pivoting axis.

10. The suspension system of claim 1, wherein a wheel for supporting the chassis is rotatably coupled to the wheel mounting member.

11. The suspension system of claim 1, wherein:
a first actuator is coupled to the first wheel arm and/or the chassis mounting member and operable to cause the first wheel arm and the chassis mounting member to pivot relative to one another; and
a second actuator is coupled to the first wheel arm and/or the wheel mounting member and operable to cause the first wheel arm and the wheel mounting member to pivot relative to one another.

12. The suspension system of claim 11, further comprising a third actuator, wherein one end of the third actuator is coupled to the first wheel arm and the other end of the third actuator is coupled to the chassis mounting member, the third actuator operable to move the first wheel arm from a first position relative to the chassis to a second position relative to the chassis to thereby alter the height of the chassis from a support surface on which it stands.

13. The suspension system of claim 1, further comprising an actuator, wherein one end of the actuator is coupled to the first wheel arm and the other end of the actuator is coupled to the chassis mounting member, the actuator operable to move the first wheel arm from a first position relative to the chassis to a second position relative to the chassis to thereby alter the height of the chassis from a support surface on which it stands.

14. A vehicle comprising a chassis and the suspension system of claim 1.

15. The vehicle of claim 14, wherein the chassis defines a plurality of mounting positions for the chassis mounting member, the mounting positions spaced around the periphery of the chassis, and the chassis defines a substantially four sided polygonal periphery, and defines mounting positions for chassis mounting members on the sides of the chassis, the mounting positions being provided proximate to, or at, each corner of the chassis.

16. The vehicle of claim 15, further comprising a plurality of the suspension units, wherein the mounting positions for the chassis mounting members are spaced apart, and components of the suspension units are configured such that throughout range of motion of any one of a plurality of wheel arms, any one of the suspension units remains spaced apart from wheel arms of another one of the suspension units.

17. A method of control of operating a suspension system for a vehicle, the suspension system including a wheel arm assembly comprising a first wheel arm having a chassis mount end and a wheel mount end; the chassis mount end of the first wheel arm being provided with a chassis mounting member, the chassis mount end of the first wheel arm and the chassis mounting member being pivotable relative to one another around a chassis mount pivoting axis, and the chassis mounting member configured to support the chassis mount end of the first wheel arm so that the first wheel arm and the chassis mounting member are operable to pivot at least 180 degrees relative to one another about the chassis mount pivoting axis; the wheel mount end of the first wheel arm being provided with a wheel mounting member, the wheel mount end of the first wheel arm and the wheel mounting member being pivotable relative to one another around a wheel mount pivoting axis, and the wheel mounting member is configured to couple with the wheel mount end of the first wheel arm so that the first wheel arm and the wheel mounting member are operable to pivot at least 180 degrees relative to one another about the wheel mount pivoting axis; a first actuator is coupled to the first wheel arm and/or the chassis mounting member and operable to cause the first wheel arm and the chassis mounting member to pivot relative to one another; and a second actuator is coupled to the first wheel arm and/or the wheel mounting member and operable to cause the first wheel arm and the wheel mounting member to pivot relative to one another, wherein a chassis end trunnion is provided at the chassis mount end of the first wheel arm, the chassis end trunnion being pivotably attached to the chassis mounting member, the chassis end trunnion and the chassis mounting member being pivotable relative to one another around the chassis mount pivoting axis, and the chassis mounting member configured to support the chassis mount end of the first wheel arm via the chassis end trunnion; and wherein a wheel end trunnion is provided at the wheel mount end of the first wheel arm, the wheel end trunnion being pivotably attached to the wheel mounting member, the wheel end trunnion and the wheel mounting member being pivotable relative to one another around the wheel mount pivoting axis, and the wheel mounting member is configured to support the wheel mount end of the first wheel arm via the wheel end trunnion; wherein the method comprises:

operating the first actuator to move the first wheel arm and the chassis mounting member relative to one another about the chassis mount pivoting axis; and operating the second actuator to move the first wheel arm and the wheel mounting member relative to one another about the wheel mount pivoting axis;

wherein the first actuator and second actuator are operable independently of one another.

18. The method of control of claim 17, wherein the suspension system further comprises a third actuator, wherein one end of the third actuator is coupled to the first wheel arm and the other end of the third actuator is coupled to the chassis mounting member, the third actuator operable to move the first wheel arm from a first position relative to the chassis to a second position relative to the chassis; wherein the method comprises:

operating the third actuator to move the first wheel arm from a first position relative to the chassis to a second position relative to the chassis to thereby alter the height of the chassis from a support surface on which it stands; and wherein the third actuator is operable independently of the first actuator and the second actuator.

19. A suspension system for supporting a chassis of a vehicle, the suspension system comprising a suspension unit, the suspension unit comprising:

a wheel arm assembly comprising a first wheel arm having a chassis mount end and a wheel mount end, the chassis mount end of the first wheel arm being provided with a chassis mounting member, the chassis mount end of the first wheel arm and the chassis mounting member being pivotable relative to one another around a chassis mount pivoting axis, and the chassis mounting member is configured to support the chassis mount end of the first wheel arm so that the first wheel arm and the chassis mounting member are operable to pivot at least 180 degrees relative to one another about the chassis mount pivoting axis, the wheel mount end of the first wheel arm being provided with a wheel mounting member, the wheel mount end of the first wheel arm and the wheel mounting member being pivotable relative to one another around a wheel mount pivoting axis, and the wheel mounting member is configured to couple with the wheel mount end of the first wheel arm so that the first wheel arm and the wheel mounting member are operable to pivot at least 180 degrees relative to one another about the wheel mount pivoting axis; and a chassis end trunnion is provided at the chassis mount end of the first wheel arm, the chassis end trunnion being pivotably attached to the chassis mounting member, the chassis end trunnion and the chassis mounting member being pivotable relative to one another around the chassis mount pivoting axis, and the chassis mounting member is configured to support the chassis mount end of the first wheel arm via the chassis end trunnion; and a wheel end trunnion is provided at the wheel mount end of the first wheel arm, the wheel end trunnion being pivotably attached to the wheel mounting member, the wheel end trunnion and the wheel mounting member being pivotable relative to one another around the wheel mount pivoting axis, and the wheel mounting member is configured to support the wheel mount end of the first wheel arm via the wheel end trunnion.

20. The suspension system of claim 19, wherein the wheel arm assembly comprises a second wheel arm.

\* \* \* \* \*